(12) United States Patent
Morabit

(10) Patent No.: US 9,414,540 B2
(45) Date of Patent: Aug. 16, 2016

(54) ORIENTED TRIMMER LINE

(75) Inventor: Vincent D. Morabit, Rock Hill, SC (US)

(73) Assignee: AERO-FLEX TECHNOLOGIES, INC., Rock Hill, SC (US)

( * ) Notice: Subject to any disclaimer, the term of this patent is extended or adjusted under 35 U.S.C. 154(b) by 304 days.

(21) Appl. No.: 13/071,068

(22) Filed: Mar. 24, 2011

(65) Prior Publication Data

US 2011/0232436 A1 Sep. 29, 2011

Related U.S. Application Data

(60) Provisional application No. 61/316,895, filed on Mar. 24, 2010, provisional application No. 61/383,117, filed on Sep. 15, 2010.

(51) Int. Cl.
*A01D 34/416* (2006.01)
*A01D 34/90* (2006.01)

(52) U.S. Cl.
CPC .......... *A01D 34/902* (2013.01); *A01D 34/4168* (2013.01); *Y10T 83/04* (2015.04)

(58) Field of Classification Search
CPC .................................................. A01D 34/4168
USPC ...................... 30/276, 347; 56/12.7
See application file for complete search history.

(56) References Cited

U.S. PATENT DOCUMENTS

| | | | | |
|---|---|---|---|---|
| 4,190,954 | A | * | 3/1980 | Walto .............................. 30/347 |
| 4,505,040 | A | * | 3/1985 | Everts .......................... 30/296.1 |
| 4,825,627 | A | * | 5/1989 | Truderung ..................... 56/12.7 |
| 5,761,816 | A | | 6/1998 | Morabit et al. |
| 5,996,233 | A | | 12/1999 | Morabit et al. |
| 6,014,812 | A | | 1/2000 | Webster |
| 6,161,292 | A | | 12/2000 | Morabit et al. |
| 6,176,015 | B1 | | 1/2001 | Morabit et al. |
| 6,301,788 | B1 | * | 10/2001 | Webster ......................... 30/276 |
| 6,314,848 | B2 | | 11/2001 | Morabit et al. |
| 6,415,585 | B2 | | 7/2002 | Morabit et al. |
| 6,748,664 | B2 | * | 6/2004 | Dirks et al. .................... 30/276 |
| 6,862,871 | B2 | | 3/2005 | Morabit et al. |
| 2001/0003935 | A1 | * | 6/2001 | Morabit et al. ................... 83/13 |
| 2001/0034940 | A1 | * | 11/2001 | Marshall et al. ................ 30/276 |
| 2002/0116826 | A1 | * | 8/2002 | Sanders et al. ................. 30/276 |
| 2004/0148784 | A1 | * | 8/2004 | Grace ............................. 30/276 |
| 2008/0233398 | A1 | * | 9/2008 | Legrand ....................... 428/399 |
| 2010/0101099 | A1 | | 4/2010 | Morabit |

* cited by examiner

*Primary Examiner* — Stephen Choi
(74) *Attorney, Agent, or Firm* — Nixon & Vanderhye P.C.

(57) ABSTRACT

A power tool head is including a trimmer head or the like is powered with an AC or DC motor. The head and tool attachment are ergonomically constructed to facilitate use and operation. In the trimmer tool, molded line blades with or without an aerodynamic cross-section provide for effective cutting at low speeds and low power requirements. The line blades may be selectively oriented to improve strength and durability.

6 Claims, 28 Drawing Sheets

2 Amp. Hr Lithium - Ion Battery

3 Amp. Hr Ni - Cad Battery

6 Amp. Hr Lithium - Ion Battery

Auxiliary DC Power
• Larger Motor
•Less Unit Work
•New Products

Battery & Companion Cart
54

Trimmer Hanger 56

Handy Seat 62

25' Extension Cord 64

Batteries

Built In Charger 58

Fig. 10

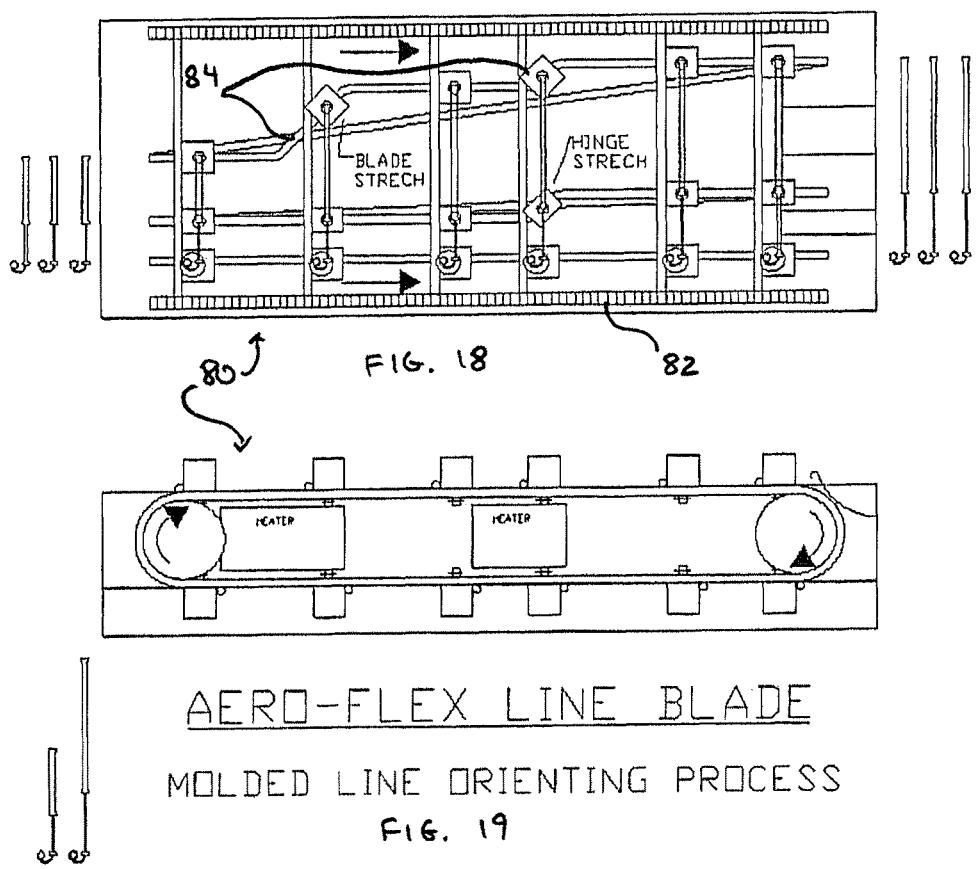

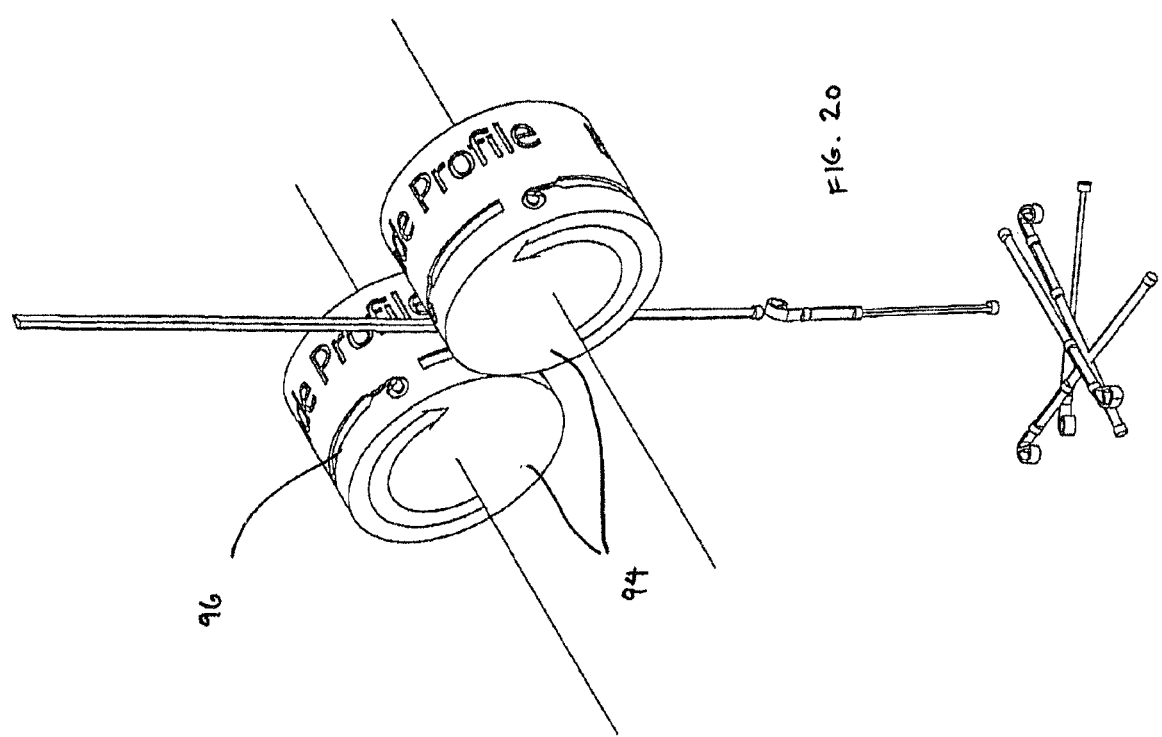

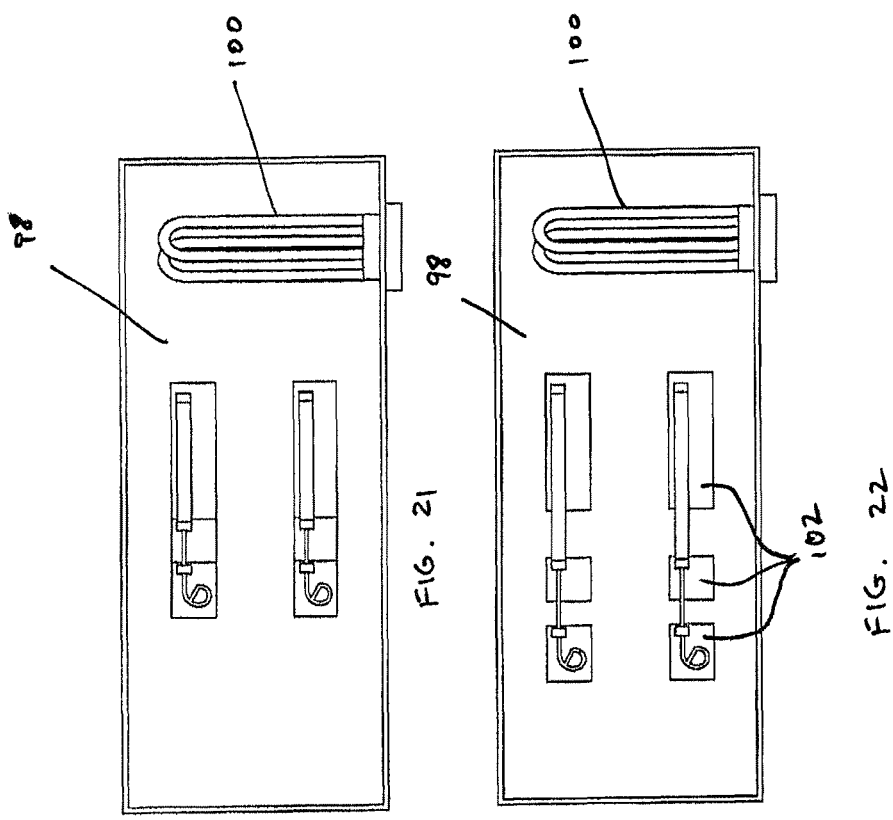

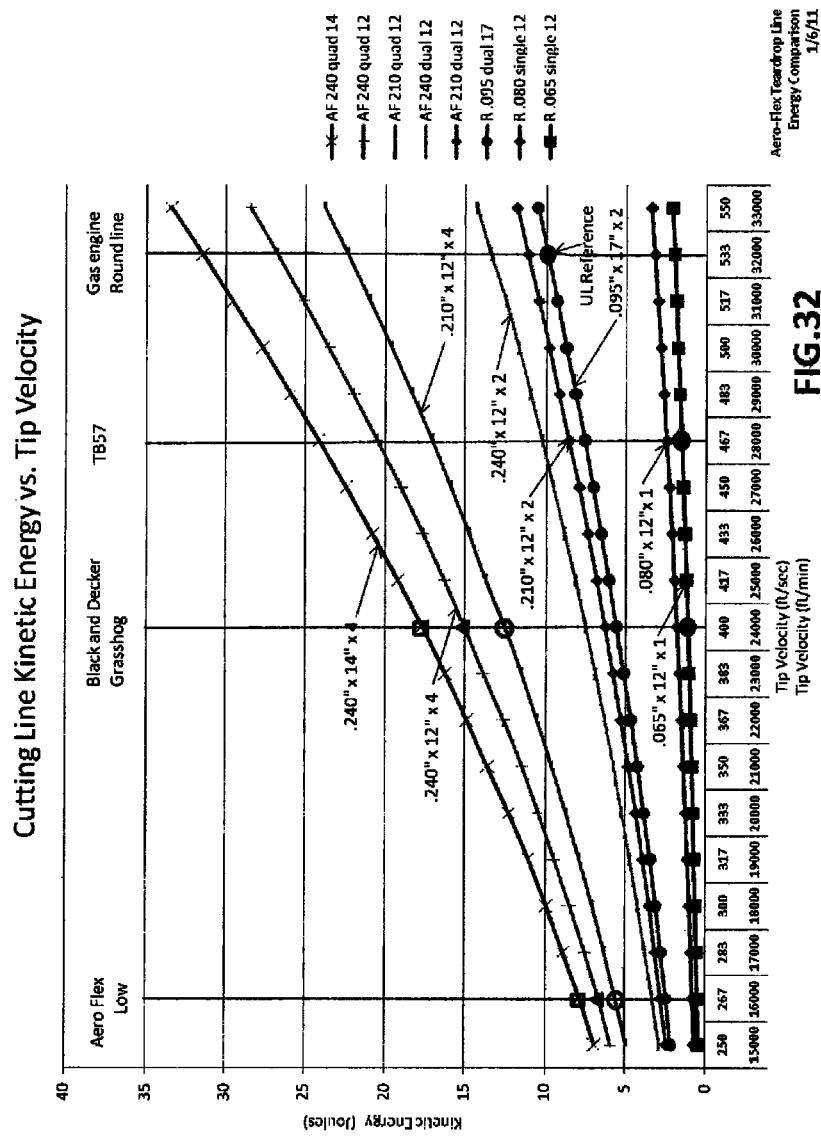

ORIENTED TRIMMER LINE

CROSS-REFERENCES TO RELATED APPLICATIONS

This application claims the benefit of U.S. Provisional Patent Application Ser. No. 61/316,895, filed Mar. 24 2010, and U.S. Provisional Patent Application Ser. No. 61/383,117, filed Sep. 15, 2010 the entire content of each of which is herein incorporated by reference.

STATEMENT REGARDING FEDERALLY SPONSORED RESEARCH OR DEVELOPMENT (Not Applicable)

BACKGROUND OF THE INVENTION

Grass trimmers have been around for over 30 years, starting with gas (high speed 2-cycle engine) power and later evolved to both AC electrics and very limited cutting capable DC (battery) cordless trimmers. Practically every household, industrial, or institutional property with grass or weeds relies on the versatility of the trimmer to finish trim its continually growing vegetation. The working effort with trimmers is performed by 'do it yourself' property owners or by professional landscapers. Approximately 10-12 million trimmers are sold annually within the United States alone.

The cutting elements used with trimmers are for the most part an extruded flexible nylon based monofilament line or string (of only one cross section—e.g., round, square star, etc.) that is oriented (stretched) which 'orients' its molecular chain to its maximum extension to achieve its maximum tensile strength. As is it stretched, its cross-section is diminished. Other less commonly used cutting attachments are both brittle plastic or combined with metal flail-like blades, but non-flexible blades that pivot on a pin. Brittle plastic blades shatter when hitting into solid obstacles. The flexible cutting line (or fishing string) frequently and continuously breaks and/or wears quite easily requiring continuous manual replenishment or from pre-wound spools integrated into a centrifugal, or bump feed systems, themselves quite complex. Due to complex advance and feed systems, fixed line systems have been popular with specially designed but costly systems needing constant manual replenishment of the rapidly wearing or breaking conventional line.

As a cutting tool, the line trimmer has been very popular, but has its own inherent problems that have to date remained unsolved. These problems have created great frustration to the user, and further have created limitations to the design of the trimmer itself, and the resulting lack of ergonomics, excess power consumption, reliability, cost, noise, vibration, and more.

The thin, low mass and weak structure of the monofilament line (cutting element) must rotate at very high tip speeds (e.g., 30,000 ft/min) in order to achieve its cutting stiffness with the speed dependant centrifugal force. As a result, the operating stresses exceed the material properties causing continuous failure and need for constant replenishment. The high speed line at impact to solid objects (rocks, fences, concrete) creates the excess stress and continuously breaks. Further, in addition to its poor cutting and edging performance, the symmetrical cross section requires high power input to push itself through the high drag of the air and grass drag causing poor trimming inefficiencies and excess power consumption. Consequently, the power driving system needs to be continuously powerful and high speed capable.

Monofilament line with such low mass and weak structure will easily fold back when spinning due to its limited strength, which further diminishes its cutting capability and quality of cut (involving grass to cause browning) Adding more line mass add to more aerodynamic drag losses. Additionally, grass drag increases the more it folds back. Accordingly, the low mass cutting line must be spinning at very high tip speeds to become a better cutting mechanism from the added centrifugal forces created by the necessary higher speeds. This process takes even more energy to drive the line through the air due to added air drag which increases by multiple powers of the higher velocities. Further, due to constant impact of the line with solid or hard objects, line breakage is certain and rapid thus requiring constant replenishment. Overall, this cutting structure creates inefficiency in power consumption, wasted power due to air and grass drag, limited or poor cutting quality and capability, and constant line replenishing harassments for the user. To solve these long and historic problems will be greatly desirable.

Often at the outer tip of the swath where the cutting occurs, the line frays and splits into 'fibrels' back along the nylon co-polymer's molecular chain. Additionally, nylon is moisture dependent and when it dries due to lower humidity environments, it has a short shelf life, as it becomes brittle to then rapidly break.

Noise (from the high speed engine and a high pitch line squeal) is also an irritating experience to both the operator and the neighborhood, often resulting in an unpleasant and irritating trimming experience, in addition to, the imposition of local and state ordinances that are restrictive to noisy engine use.

Electric trimmers are limited by the required lengthy and interfering extension cord to reach areas of the property needing trimming. Additionally, they are also subject to many of the same weak line frustrations. Homeowners (of smaller sized lots) who dislike engines (fuels, starting smoke, noise, etc) prefer the AC electric trimmer.

Due to these many inherent monofilament design problems, cordless or battery trimmers have never been able to operate in a practical sense up to the necessary speed levels required for cutting vegetation. Battery trimmers have to run generally slower tip speeds due to the limited energy carrying capacity of their batteries. Consequentially, the high required tip speed for the cutting line causes very high drag losses thus stealing and wasting the desirable energy needed to cut vegetation. Therefore, not only running time is sacrificed but also the cutting line cannot deliver adequate severing force, and further, is unable to edge with appreciable depth. Adding more mono-filament line outlets adds to the drag, further causing battery drain. Additionally, to replenish worn or broken line normally involves either tap or centrifugal advance for feeding line out from a storage spool. This frustrating process also requires another substantial energy waste to advance and replenish the weak line on a continuous basis.

Battery or cordless trimmers have only a single cutter outlet of very thin line, and become further diminished with larger cutting swath diameters. To increase the width and mass of the line, and to increase the number of cutter outlets will elevate the cordless trimmer to much higher esteem and working capability. Additionally, the limited energy storage capacities of batteries further limit running time, require lengthy and frequent charging times, and spare batteries are very costly.

Cordless trimmer motors have been predominately, if not all, "ground mounted" at the "dirty end" of the trimmer to eliminate drive cable frictional losses. Problems arise in that the motor's air cooling system clogs and overheats with the added exposure or dirt and debris. Further, the added suspended weight of the motor creates operator fatigue and discomfort. There are great advantages in relocating the motor toward the top end of the trimmer.

As the line speed drops, the cutting capability or severing forces are diminished. One analogy would be like cutting with a "wet noodle" as opposed to a "blade-like" cutter needed to slash through the vegetation intended to be cut. Further, cutting with a slower single line diminishes the frequency of cutter contact, thus extending the inefficiencies in trimming. Consequently, conventional line from a battery trimmer cannot deliver the grass contact frequencies of the forces needed to cut the variety of vegetation needed to be cut. The force delivery is nearly "benign" and the duration of its delivery is severely limited from the many conflicting factors such as battery size, weight, cost, air and grass drag, suspended weight, clogging, only to mention a few.

To increase the cutting line force at the vegetation cutting zone, and to improve battery life by better motor operational efficiency, U.S. Pat. No. 6,014,812 utilizes step-down gearing directly adjacent to its lower or ground mounted motor. This allows a DC motor to operate at its higher speed peak efficiency while gearing the tip speed down to about 24,000 ft/min., still well below the 30,000 ft/min. needed for monofilament line to cut better. However, the ground-mounted motor system still must operate in the 'dirty zone' and its suspended weight must be supported by the operator with fatigue and poor ergonomics.

Today, cordless outdoor tools such as chain saws, grass trimmers, blowers, and hedge clippers are manufactured and sold as complete units, i.e., motor, battery, handles, are connected directly to the specific cutting element. While the expensive batteries are interchangeable between the individual tools, the tools are essentially individual units. This practice is due to the inherent nature of poor cutting due to limited torque delivery systems needed to sever vegetation, and the available power limitations from battery systems.

Hand held trimmers are suspended from the operator's arms and have to be maneuvered to the area to be cut. The awkward handles, combined with the need to pull the trigger often present an uncomfortable, fatiguing, and unnatural gripping effort. The hands have to maneuver the trimmer into an angle or attitude to reach the vegetation to be trimmed or edged. Combining these strenuous movements along with the trimmer's suspension weight and irritating vibration, add to further discomfort and rapid fatigue.

Some trimmers are provided with head tilt and turning provisions to help reduce the operator difficulty. However, these adjustments require the operator to make the adjustments while away from the normal operating zone.

BRIEF SUMMARY OF THE INVENTION

All of the above problems currently experienced can be greatly reduced or minimized, or even fully resolved.

The invention teaches the numerous benefits of combining a series of scientific and engineering principles involving streamlined aero-dynamic cutting line blades, drag power recovery, multi speed range options, lower operating tip speeds when cutting against abrasive and high impact surfaces, structured and stronger but flexible cutters that deliver stronger cutting forces at lower speeds, torque amplification, multi cutter outlets to assist in reaching effective lower tip speeds, ergonomic features resulting in better operator control, more comfort, and less fatigue, very efficient utilization of valuable energy, multi-purpose power heads with selective motors better located to achieve better balance and weight distribution, and more. The system benefits from the advantages achieved with the line blades and trimmer head described in U.S. Pat. Nos. 6,862,871; 6,415,585; 6,314,848; 6,176,015; 6,161,292; 5,996,233; and 5,761,816, and pending U.S. application Ser. No. 12/607,548, the contents of which are hereby incorporated by reference.

Line blade orienting can increase tensile strength while reducing potential for impact splitting. Full or 100% orienting means "fully stretched" to its maximum tensile capability, which is determined by achieving a nearly linear alignment of the fibers of the molecular chain. Nylon can be pulled or stretched up to about 4× its original length between the pull zones. Other co-polymers may vary to the higher proportions. See FIG. 13 (Nylon Tensile Strength to Elongation), which shows increasing tensile strength with degree of elongation.

All monofilament line is "fully or 100% oriented" to achieve maximum tensile (needed for their thin but overstressed lines) but, they will split and break off rapidly at the ends while under high impact. It is desirable to custom orient the molded lines to achieve specific design purposes targeting different performance benefits.

In an exemplary embodiment, a power tool includes an arm assembly secured on an upper boom, and an AC or DC motor disposed on the upper boom adjacent the arm assembly. The motor serves to drive a drive shaft. A cable drive is coupled with and driven by the drive shaft. A forward handle is secured to the upper boom. The power tool includes a tool including a lower boom, and a gear box secured on the lower boom and coupled between the cable drive and the tool. The gear box serves as a gear reducer and torque amplifier. The tool includes a tool implement on the lower boom that is coupled with the gear box and driven by the motor via the drive shaft, the cable drive and the gear box.

The power tool may be provided with an attachment receiver disposed at a distal end of the upper boom, where the tool is detachably connected to the upper boom via the attachment receiver, and where the attachment receiver comprises a coupling for the cable drive. In this context, the tool may be one of a trimmer, a hedge clipper, a chain saw, a roto-tiller, a stick edger, a blower, a cultivator, a wheel-mounted rotary mower, a leaf mulcher, a yard vacuum, etc.

In one embodiment, the tool is a trimmer and includes a rotatable trimmer head operatively connected to the motor via the drive shaft, the cable drive and the gear box, and flexible molded line blades secured to the trimmer head. Preferably, the flexible molded line blades may have an aerodynamic cross-section. Moreover, the flexible molded line blades may be divided into geometrical zones along a length of the line blades, where the molded line blades are oriented by zone to increase tensile strength and prevent end splitting. In this context, the zones may include a hinge zone and a cutting zone, where a percent orientation of the hinge zone is different than a percent orientation of the cutting zone. In one arrangement, the hinge zone is 10-80% oriented, and the cutting zone is 5-70% oriented. Still further, the rotatable trimmer head may be tiltable and turnable relative to the lower boom while being held by an operator.

The motor may be a multi-speed reversible motor, where the arm assembly includes a trigger coupled with the motor. The trigger is provided with multiple positions corresponding to a desired speed of the motor, where the arm assembly includes a switch coupled with the motor for selecting a direction of the motor.

In one embodiment, the motor is a DC motor, and the power tool further includes a battery connected with the DC motor. In this context, the battery is attached to the arm assembly and positioned to counterbalance a weight of the motor. The arm assembly may include a handle, where the battery is attached behind or to a rear of the handle. Alternatively, the battery may be disposed in one of a waist belt and a backpack wearable by a user, where the battery is connected with the motor via an electrical line. In still another alternative, the battery may be disposed in companion cart, where the battery is connected with the motor via an electrical line.

The arm assembly may include a handle positioned toward a bottom of the upper boom and an arm rest positioned relative to the handle such that the arm rest is disposed adjacent an operator's forearm when the operator grasps the handle.

In another exemplary embodiment, a rotating trimmer tool includes an upper section including an arm assembly and an AC or DC motor; and a lower section including a trimmer head operatively coupled with the motor via a gear box. The trimmer head supports flexible molded line blades having an aerodynamic cross-section. The trimmer head and flexible molded line blades are configured for operation at blade tip speeds of less than 21,000 ft/min. The motor is preferably a DC motor, where the rotating trimmer tool further includes a battery connected with the DC motor, and where the battery is secured to the upper section and positioned to counterbalance a weight of the motor.

In yet another exemplary embodiment, a method of operating a rotating trimmer tool using flexible molded line blades with an aerodynamic cross-section that are secured to a rotating trimmer head includes the steps of selecting an operating speed according to vegetation to be trimmed, the operating speed being selected such that blade tip speeds are less than 21,000 ft/min; selecting a rotating direction for the trimmer head; and driving the rotating trimmer head with an AC or DC motor coupled to the rotating trimmer head via a cable drive and a gear box separated from the motor according to the selected operating speed and direction. The method may additional include one of updraft trimming and downdraft trimming and blowing according to the selected rotating direction and by virtue of a pitch angle of the aerodynamic cross-section of the flexible molded line blades.

BRIEF DESCRIPTION OF THE DRAWINGS

These and other aspects and advantages of the invention will be described in detail with reference to the accompanying drawings, in which:

FIGS. 10 and 11 show a battery/companion cart for use with the tool;

FIGS. 18 and 19 show a conveyor through heaters, and track camming for orienting the line blades;

FIG. 20 shows an extruding process with a following forming and orienting;

FIGS. 21 and 22 show orienting using a hot bath and holding blocks;

FIGS. 31 and 32 show kinetic energy for different cutting lines and tools at different speed ranges.

DETAILED DESCRIPTION OF THE INVENTION

Figure 1:
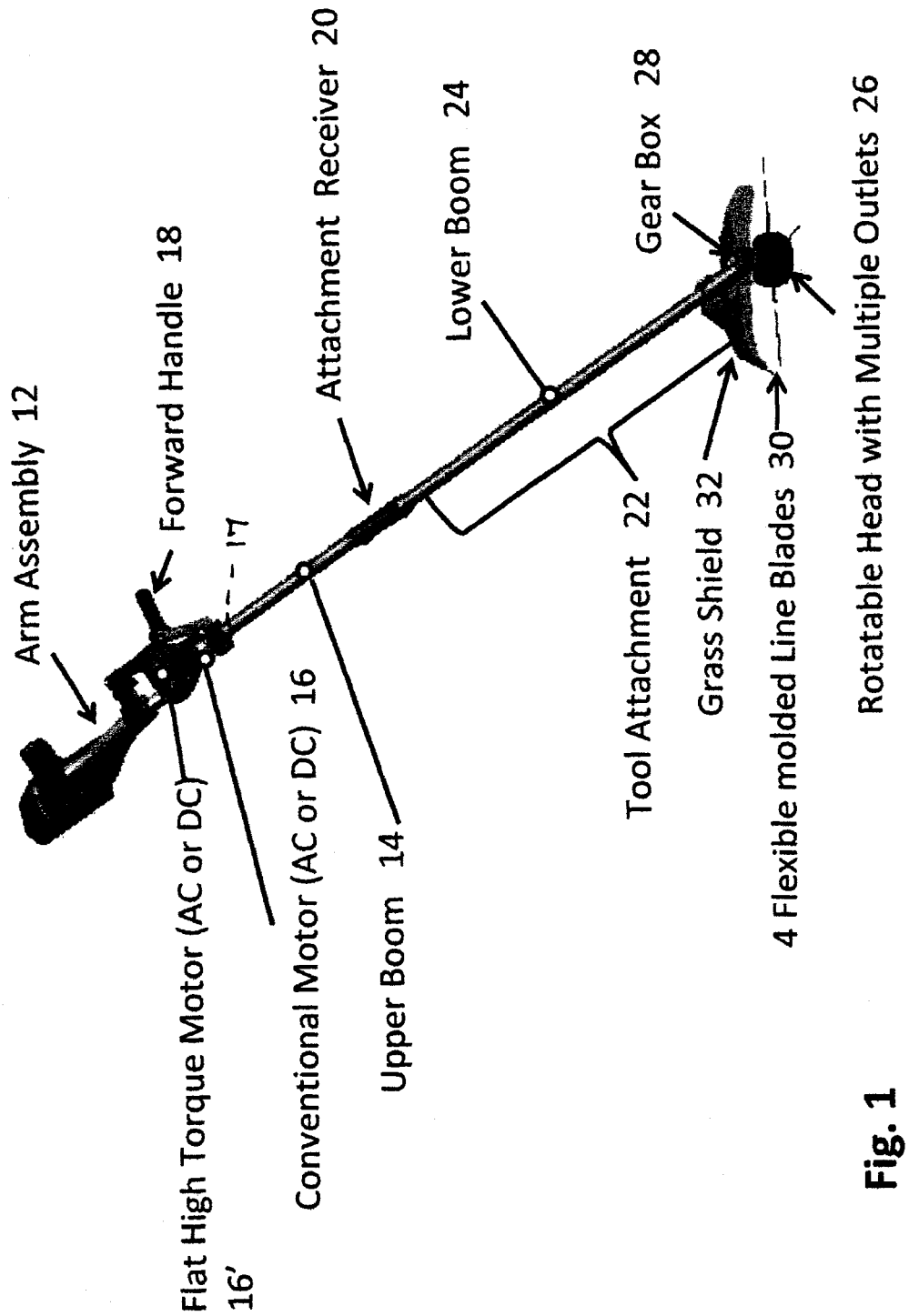
FIG. 1 is a perspective view of the tool including a trimmer attachment.
Figure 1A:
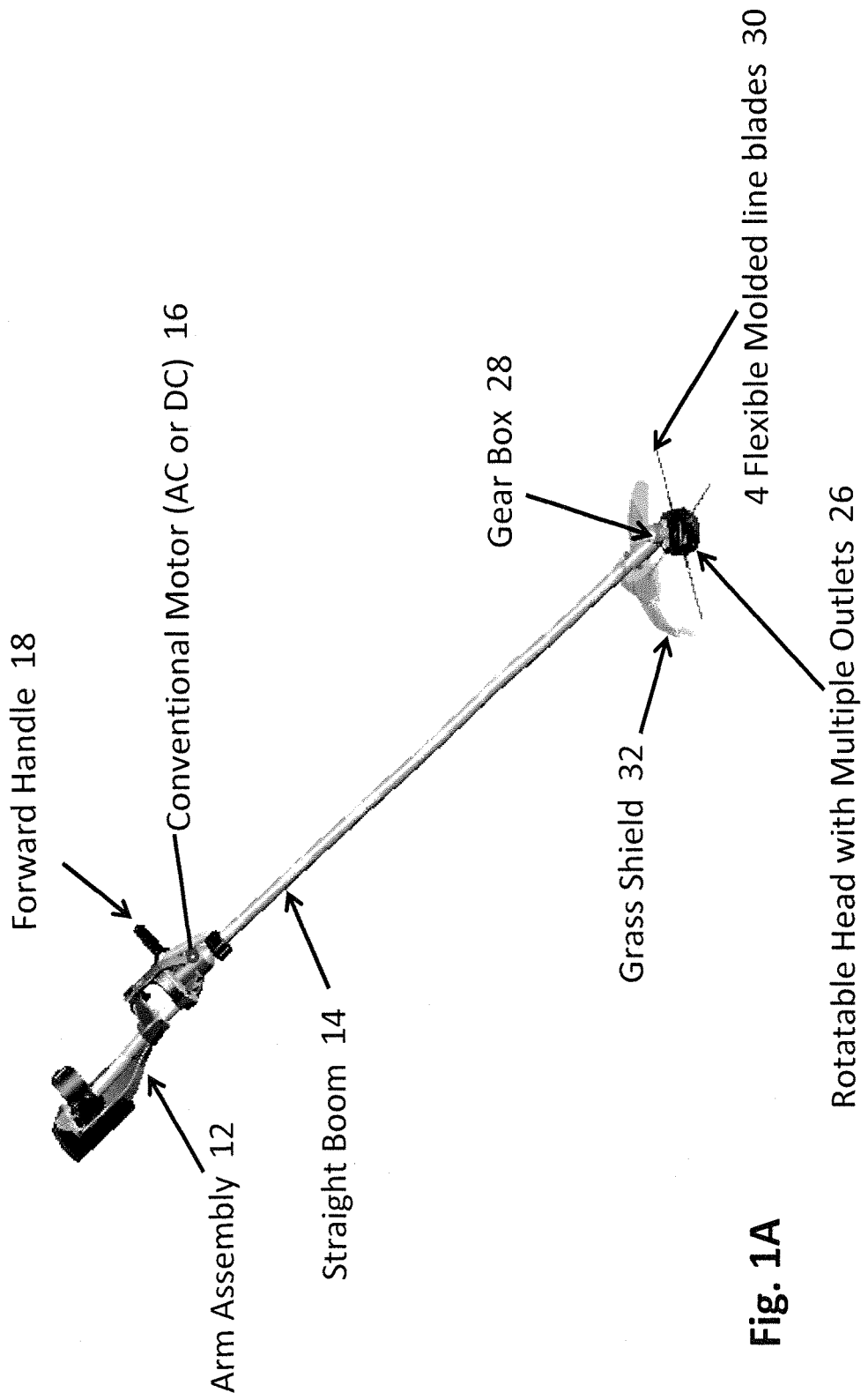
FIG. 1A is a perspective view of the tool without a trimmer attachment receiver.
Figure 2:
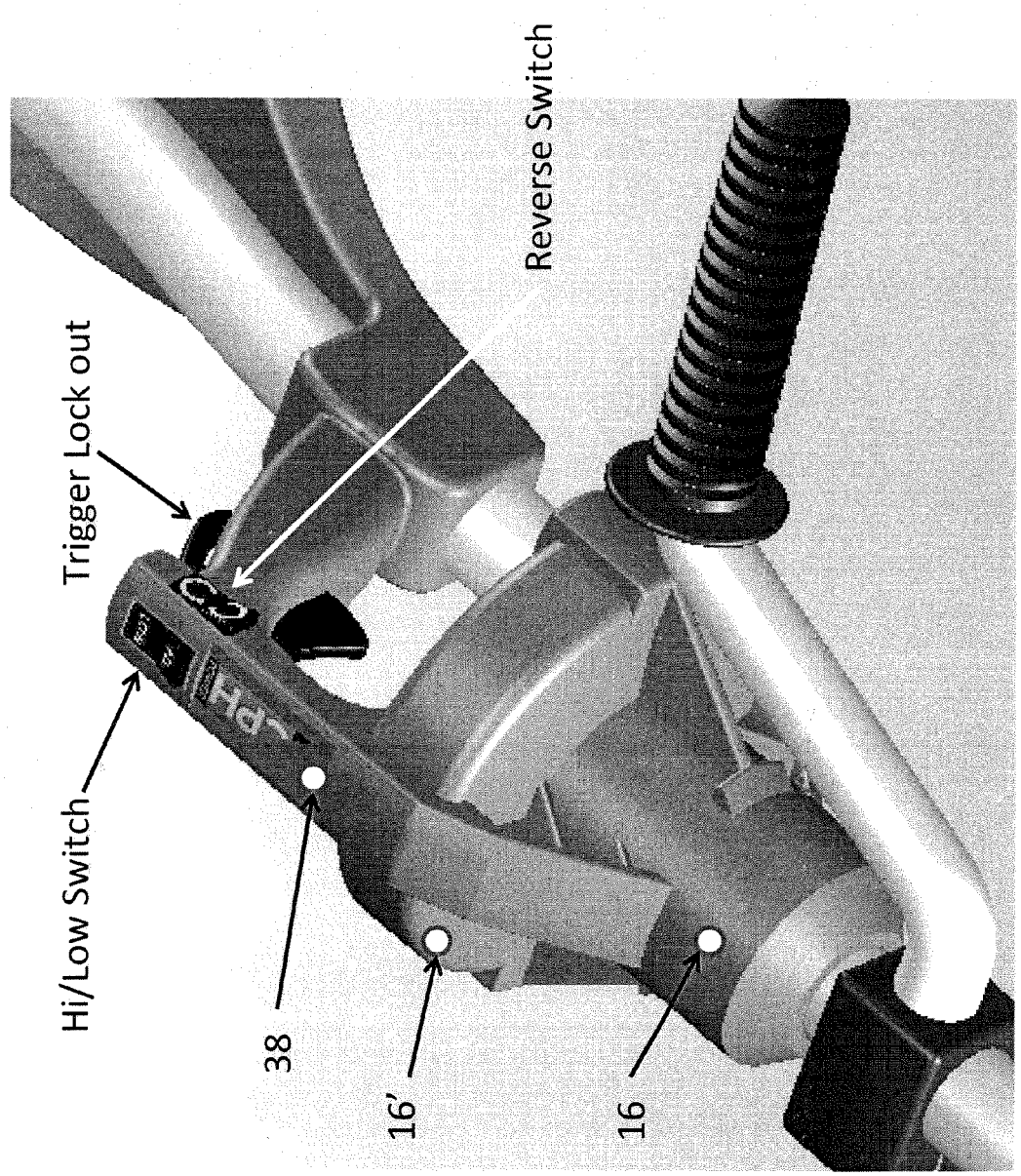
FIG. 2 is a close-up perspective view showing alternative motor housings and various controls.

With reference to FIGS. 1-4, a combined power tool head and tool attachment 10 includes an arm assembly 12 secured on an upper boom 14. An AC or DC motor 16 is disposed in a multiple fitting housing on the upper boom 14 adjacent the arm assembly 12. FIG. 2 shows the tool including a conventional motor 16 and a "flat" high torque motor 16'. The motor 16 drives a drive shaft 17 disposed inside the upper boom 14. A forward handle 18 is also secured to the upper boom. The upper boom 14 with arm assembly 12, motor 16 and forward handle 18 define an upper section of the tool.

Figure 4:
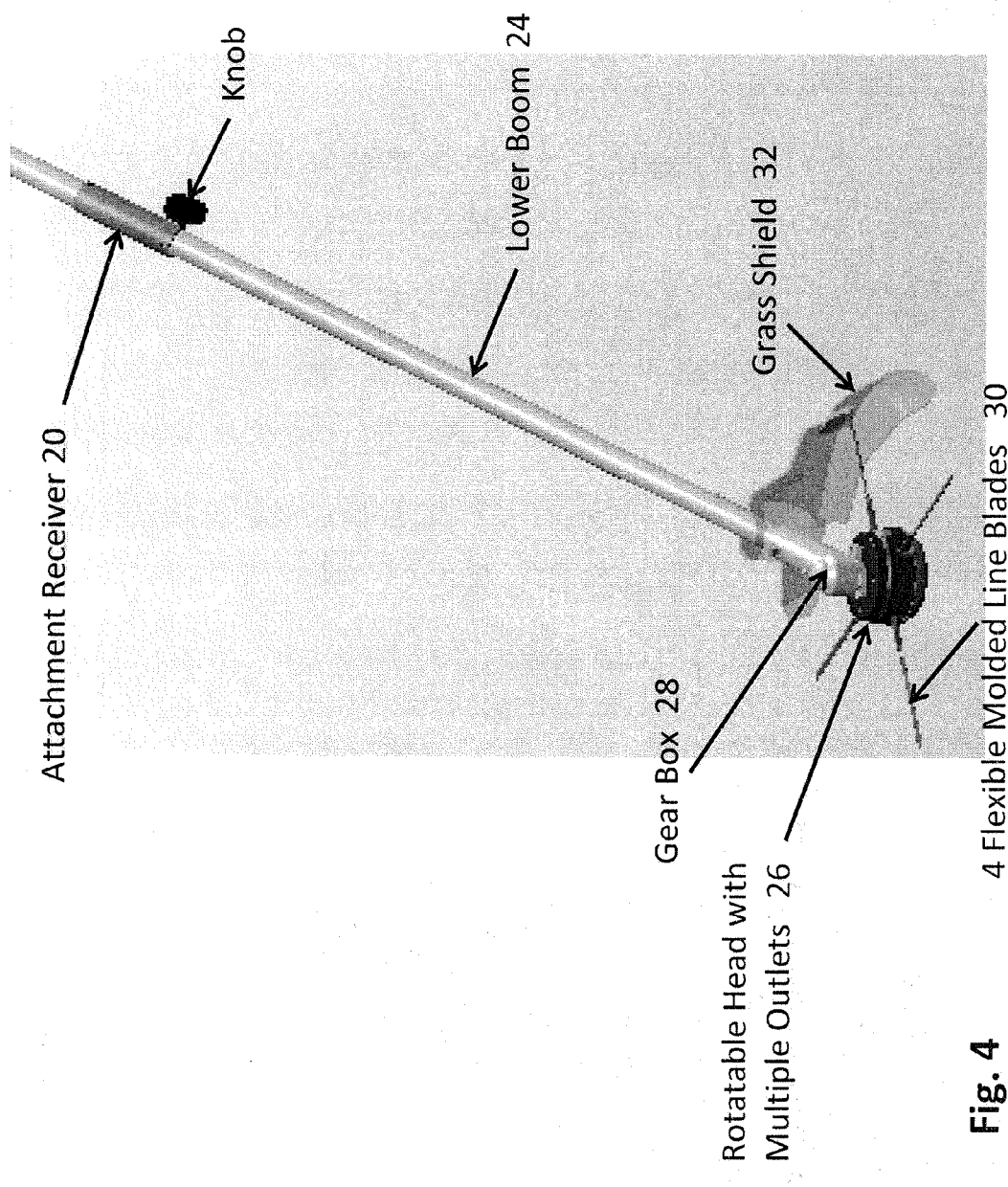
FIG. 4 is a close-up view of the trimmer attachment.
Figure 4A:
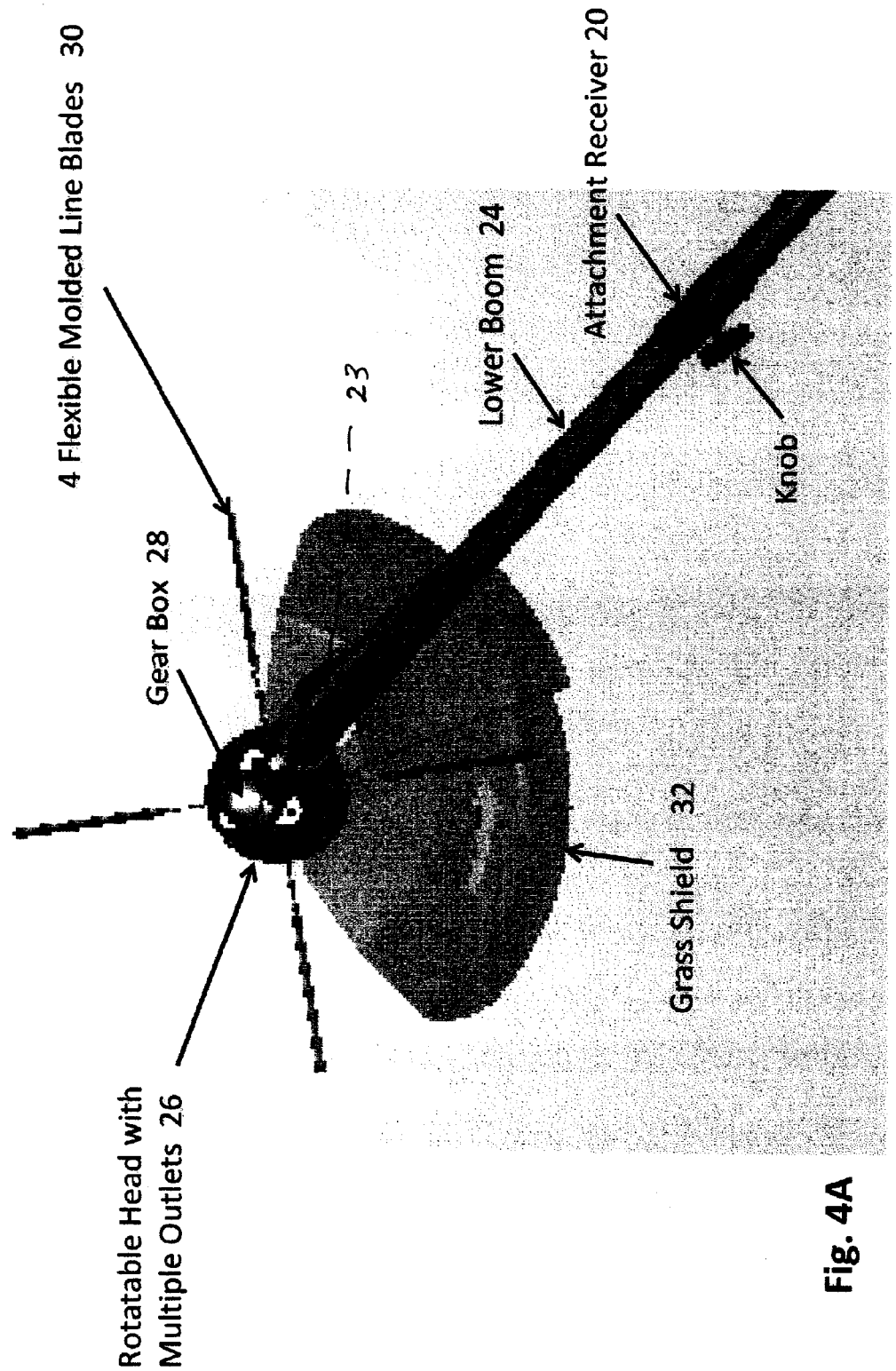
FIG. 4A is a close-up view of the trimmer attachment from the rear side.

An attachment receiver 20 is disposed at a distal end of the upper boom 14. A tool attachment 22 includes a lower boom 24 detachably connected to the upper boom 14 via the attachment receiver 20. The tool attachment 22 includes a cable drive 23 (see FIG. 4A) operatively coupleable to the drive shaft, e.g., via a gear box 28. As shown in FIG. 1, the tool attachment 22 may comprise a trimmer including a rotatable trimmer head 26 operatively connected to the motor 16 via the drive shaft (internal cable drive) and a gear box 28. The gear box 28 serves as a gear reducer and amplifies torque. Any type of gearbox could be used such as a beveled gear gearbox as would be apparent to those of ordinary skill in the art. The head 26 includes multiple flexible molded line blades 30 (preferably two or more) that preferably have an aerodynamic cross-section. A selection of light reflective colors (e.g., orange and yellow) for the flexible molded line blades provides for a more visible line blade plane for better control, for plant preservation, and for clearance from hitting destructive objects to lengthen line blade cutter life. The reflective surfaces may exceed 0.160 inches. A grass shield 32 is also shown. In the exemplary embodiment shown in FIG. 1, the trimmer head 26, flexible molded line blades 30 and the lower boom 24 define a lower section of the tool.

Figure 3:
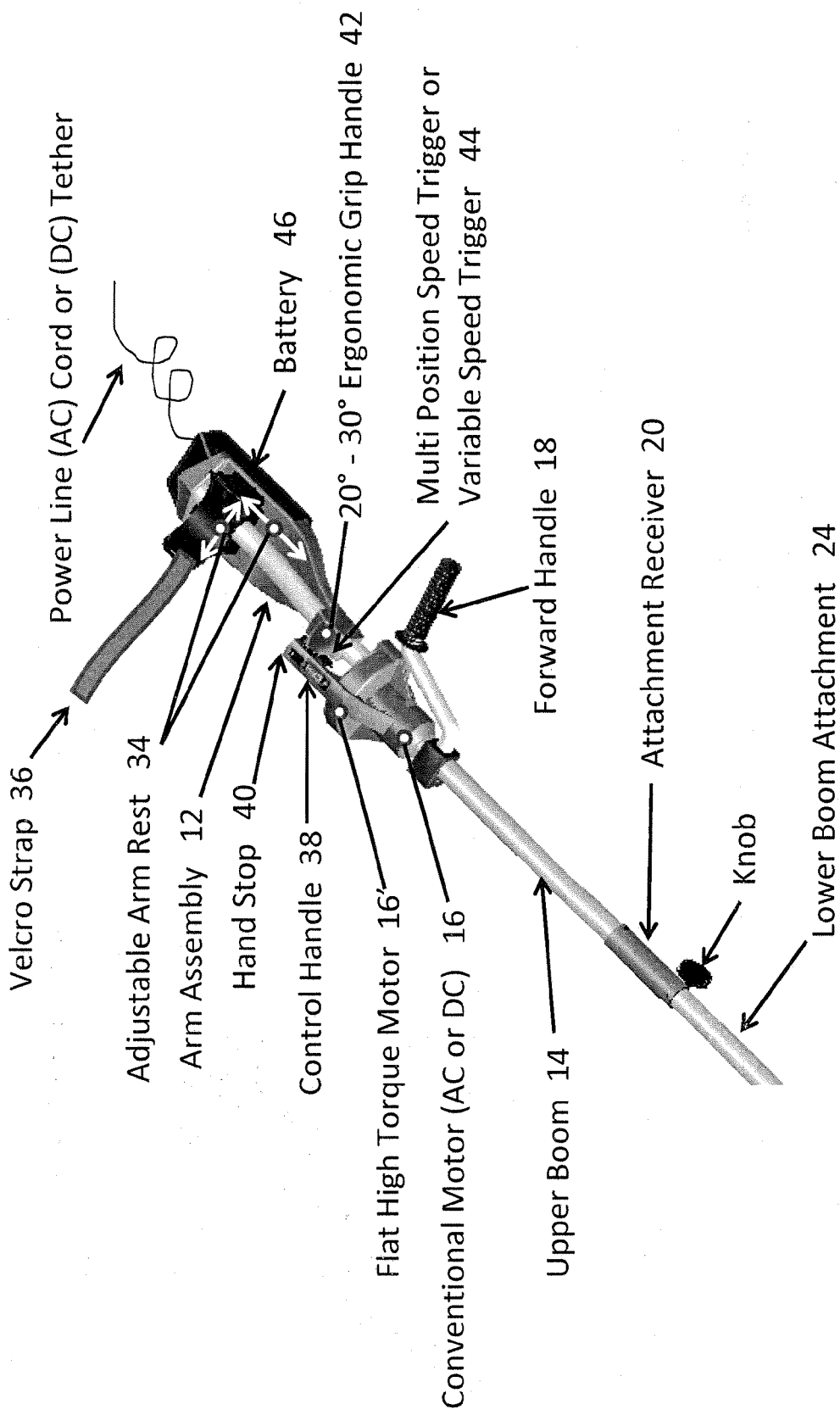
FIG. 3 is a close-up view of the arm assembly and upper boom.

FIG. 3 is a close-up view of the upper section. The arm assembly 12 is provided with adjustable and natural gripping structures that are highly controllable while reducing strain and maximizing comfort. An adjustable arm rest 34 is both size-adjustable and position-adjustable and includes a Velcro® strap 36 providing a more secure support for the user. The control handle 38 (also shown in FIG. 2) includes a hand stop 40, a 20°-30° ergonomic grip handle 42, and a multi-position speed trigger or variable speed trigger 44. The handle 38 is used to control the tool to any circumferential location (enabling the operator to operate the tool from the right or the left). The handle (see FIG. 2) may also include a trigger lock out that prevents unwanted trigger activation, and a reverse switch that enables the operator to select a direction for the motor 16. A battery 46 (for use with a DC motor) is positionable on an underside of the arm assembly 12, preferably below the hand grip 38. The motor 16 may be more desirably located forward of the handle 38 to counterbalance the weight of the battery 46, which may be located to the rear of the handle 38.

Figure 3A:
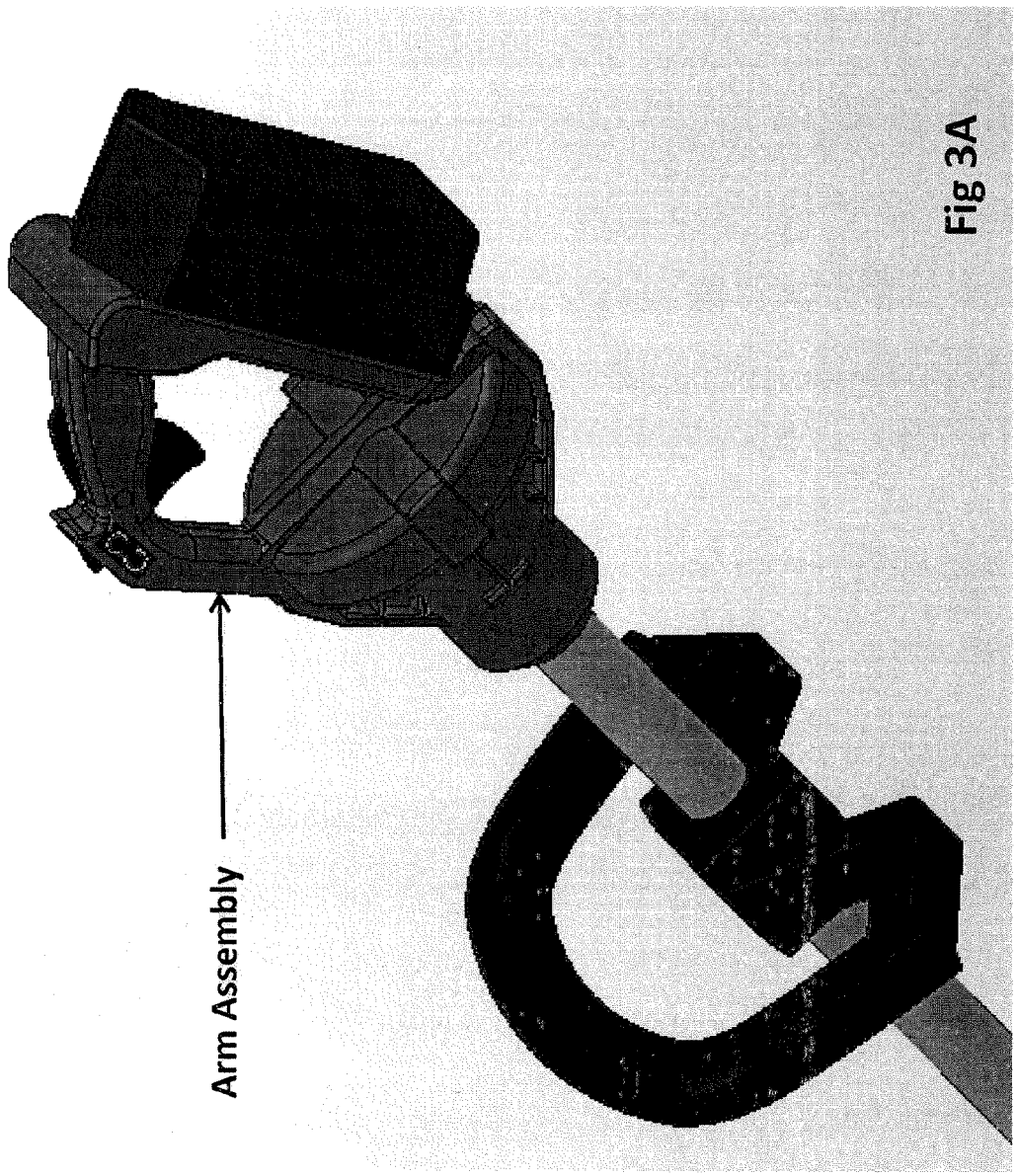
FIG. 3A is a close-up view of an arm assembly without an extended arm rest.

In an alternative embodiment, the arm assembly 12 is without the arm rest 34 as shown in FIG. 3A. Still, the motor is forward of the handle 38, and a center of gravity of the battery is generally behind the handle grip to counterbalance the motor around the handle grip also configured at 20-30°.

The use of molded line blades (preferably two or more) having a blade-like aerodynamic cross section enables the trimmer head and line blade cutter to be run at lower speeds. The multi-position speed trigger 44 is preferably provided with three speed selections, including HIGH for heavy vegetation cutting, MEDIUM for updraft rotary type mowing (horizontal plane of line blades), and LOW for edging or when vegetation is supported against an object. Updraft trimming (like a rotary mowing process) is achieved by selecting a rotation direction (clockwise or counter-clockwise) in which the line blade angular pitch orientation performs cutting while directing air flow upward. Downdraft blowing is the opposite spinning direction. A reversing switch (see FIG. 2) on the handle 38 causes the motor 16 to change direction. With pitched line blades, changing the direction of rotation would convert from updraft trimming to downdraft trimming or vice versa.

Figure 1B:
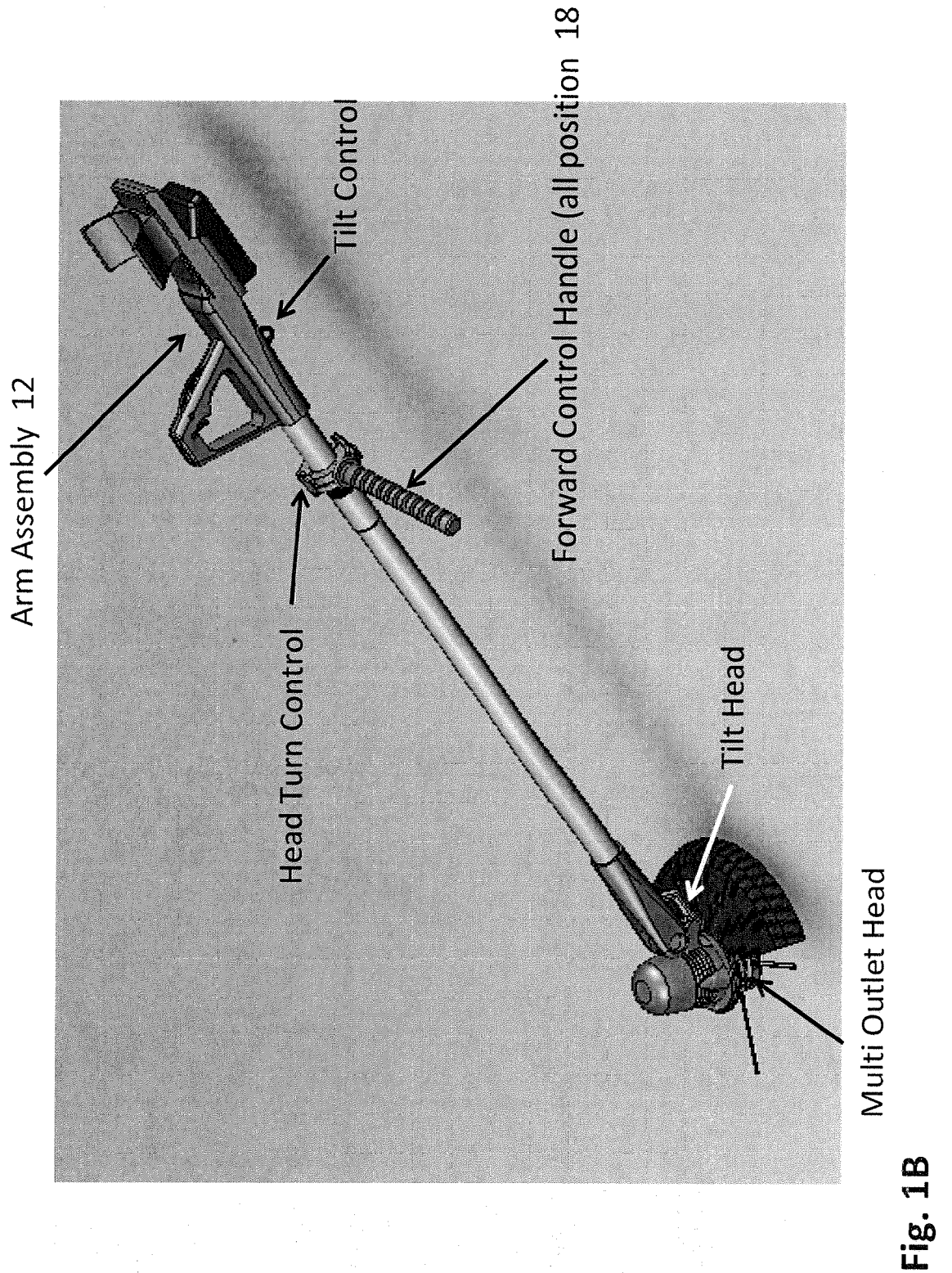
FIG. 1B is a perspective view of a trimmer with tilt and turn controls.

With continued reference to FIG. 1, with the trimmer attachment, for example, the head 26 may be tilted and/or turned from the operator's position without the need for the operator to reposition. That is, adjustments to head tilt and turn can be easily and conveniently made while maintaining an upright hand grip and arm position and without having to leave the operator station. The head tilt is preferably displaceable between an angle of ±30°. Adjusting the head tilt facilitates trimming downward and/or upward slopes without having to reposition the trimmer boom angle. Additionally, adjusting the head tilt adjusts for parallel line plane for varied operator height differences and for other trimmer head positioning preferences. Additionally, the head may be turned side-to-side from the operator's station. The forward handle 18 may be provided with rotational locking features to facilitate adjustment of the head turn. FIG. 1B shows a sliding tilt control lever on the underside of the arm assembly 12 used to adjust head tilt.

Figure 5:
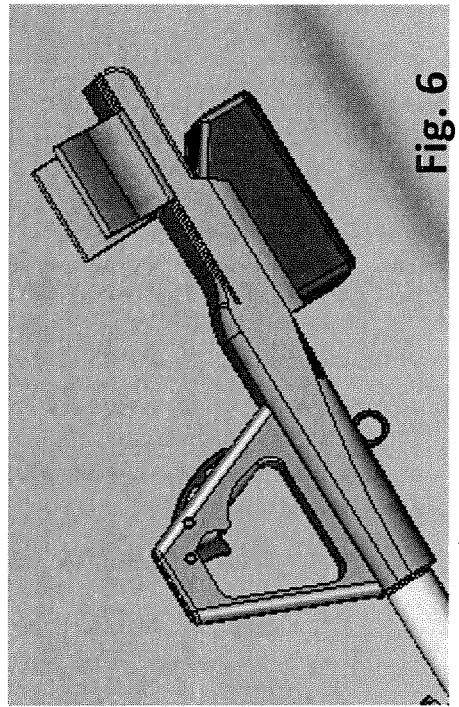
FIGS. 5-7 show the arm assembly with alternative battery types.
Figure 6:
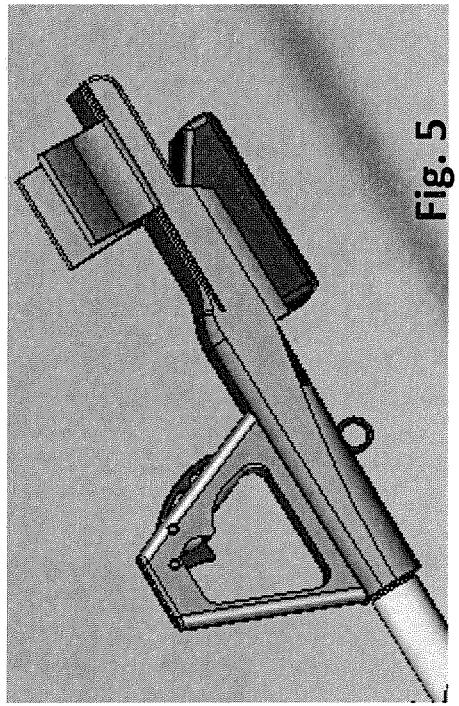
Figure 7:
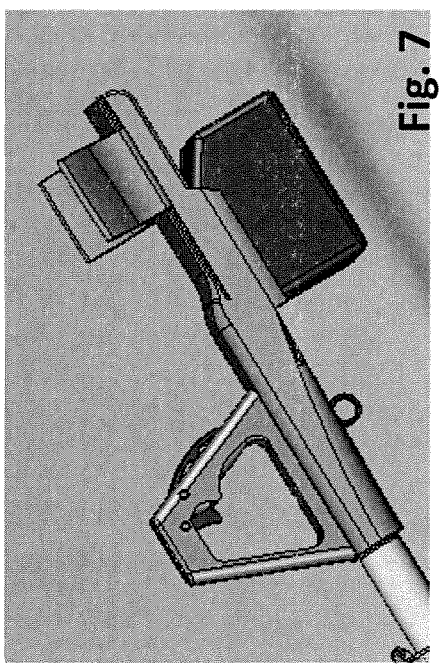
Figure 9:
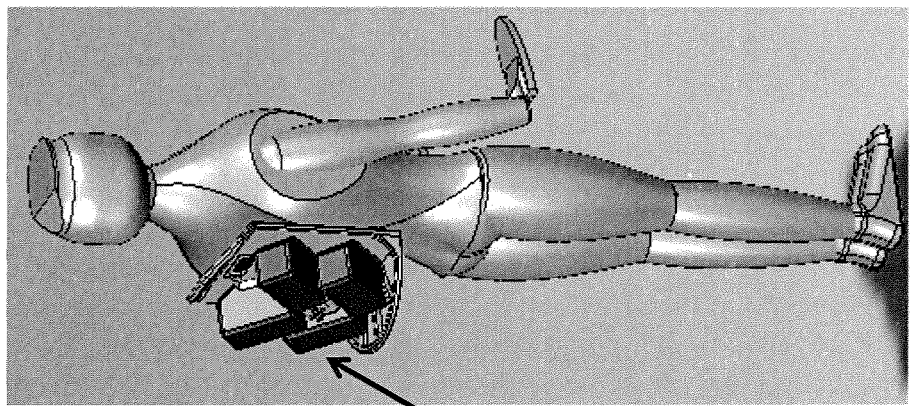
FIG. 9 illustrates a battery back pack.
Figure 8:
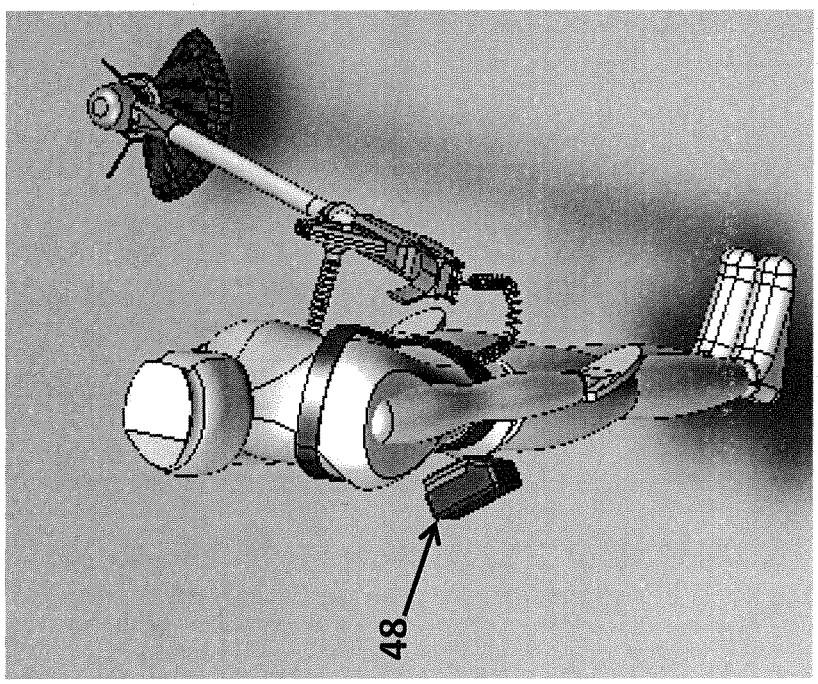
FIG. 8 illustrates a battery waist pack.

FIGS. 5-7 show alternative battery configurations for use with a DC motor. Battery power efficiencies in combination with advantages associated with flexible molded line blades (e.g., efficient low drag, stronger cutting, higher mass, lower cutting speed, etc.) provide for more powerful motors and more capable cutting with a cordless, battery-powered tool. FIG. 5 shows an exemplary 2 amp hour lithium-ion battery, FIG. 6 shows a 3 amp hour nickel-cadmium battery, and FIG. 7 shows a 6 amp hour lithium-ion battery. The larger battery shown in FIG. 7 is used in current trimmers, which require significantly more power and are susceptible to higher drag, etc. as discussed in the Background. Smaller batteries such as the 2 amp hour lithium-ion battery shown in FIG. 5 make the trimmer tool easier to use with less bulk and lower weight. The nickel cadmium battery shown in FIG. 6 is less costly than the lithium-ion battery.

FIGS. 8-11 show alternative battery power sources including a battery waist pack 48 and a battery back pack 50. Each construction would include a tether cable 52 or other electrical line to connect the battery and the motor. The waist pack or back pack may also be handy for carrying small tools, clippers, etc.

FIGS. 10 and 11 show a battery/companion cart that carries larger capacity batteries typically too heavy to carry with the trimmer. The cart 54 may be provided with additional features to facilitate use of the trimmer tool. Exemplary features include a trimmer hanger 56, a built-in charger 58, a carrier netting 60 for smaller garden tools or the like, a trash can hanging bracket, a convenient seat 62, a twenty-five foot extension cord 64, etc. The cart can be used as a power source for other power attachments and power tools. The cart may also include radio or music features that run on battery power.

The combinations and family of DC motor-driven trimmers is at least partially made possible with the use of multiple line blade outlets (2, 4 or 6); varied cutter mass; efficient low air and grass drag; and multi-speed levels for low line blade wear rates at threshold lower speed levels. The fuel-free trimmer with combined features and use of auxiliary DC power source alternatives provides a family of new and different DC motor driven trimmers from small stand-alone trimmers to larger more powerful trimmers requiring heavier and bulkier battery sources of stored energy.

Although the foregoing description describes the tool attachment in the context of a trimmer, other attachment options are available including, without limitation, a hedge clipper, a chain saw, a roto-tiller, a stick edger, a blower, a cultivator, a wheel-mounted rotary mower, a leaf mulcher, a yard vacuum, etc. Each attachment includes a suitable connector to engage the motor drive shaft via the attachment receiver 20.

Used with the trimmer tool and aerodynamic line blades, the power head and trimmer attachment tool 10 will edge and trim with high energy efficiency and non-stop performance without the usual cutting line failure interruptions. Efficient trimming is accomplished at very low flexible cutter tip speeds of less than 21,000 feet per minute. The tool will also rotary mow with updraft air that lifts the grass for a cleaner cut, scalp, mulch, slash and blow at different elevation speeds.

Moreover, the power head and trimmer tool attachment efficiently drives multiple, flexible, high mass, structured and strong line blades with low RPM edging and multiple speed trimmers combining numerous features:

RPM Range (head) 3200-6700 RPM (10,000 ft/min—21,000 ft/min as calculated for a 12" cutting swath)

Two or more outlets (lines), preferably 4 outlets, strong flexible (oriented) cutter line, or aerodynamic line blades with twist and living hinge; normal setting of pitch angle for updraft to lift and tighten grass before cutting; for downward blowing, optional reverse switch, or reload line blades with opposite pitch for downdraft trimming.

Conventional motor or 'Flat' (ex. Core) motor for direct in line power transmission to drive shaft.

Preferably, motor is located between rear trigger handle and between the rear trigger handle and lower boom attachment receiver/register (keeps motor away from "dirty end" of working cutter head and lines, and combines suspended weight balance advantages). If without the attachment register, the motor I preferably located beyond the rear trigger handle but above and separate from the lower mounted gear box.

Other motor location options include any location above attachment receiver/register or separate from the gearbox Trigger handle control grip and adjustable armrest for comfort and natural balance; control grip set between 20-30° for best and natural ergonomic gripping.

Trigger control switching: hi/lo—trim/edge; reverse head rotation for blower; or with variable trigger controls Motor and battery counter-balanced Maximum utilization of stored charge; use of all types of battery technologies to accomplish the intended job objectives.

Powered by electric motor—
 Corded AC—motor of generally lower power compared to those needed by conventional monofilament lines
 Cordless DC—motor combined with reduction gearbox produce high torque delivery at lower speeds Preferably CCW rotation for better ergonomics (when vertical edging in a forward walking direction, for more natural thrusting, and when flat trimming on the right side of the swath for better visibility while the line blades propel debris away from the operator).

Operator uses advantages of higher self-propelling thrust to assist trimmer progress along the direction of the intended edge line.

Split boom attachment, or full (straight or curved) boom with cable drive to gear box with torque amplification options greater that a 1.1:1 reduction ratio.

Cutting swath diameter range 8" diameter or greater

Takes advantage of self propelling thrust that assists progress of trimmer along the direction of the edge line to be trimmed.

High mass cutters and/or structured profile (beam-like)
 Non symmetrical flexible cutter (aerodynamic or non-aero profiles)
 Structured stiffness (more rectangular, or 'I' beam-shaped) with long axis maintained into rotating direction.

High reduction in aerodynamic drag with aero-profiled cutters, and lower operating line blade tip speeds are proven by dynamometer measurements (see FIGS. 25, 25A-27); lower drag recovers power lost to conventional line to be more efficiently utilized for higher torque delivery motors, and with further torque amplification with use of step down gearing systems separated from the motor.

Trims/mows with updraft line blade pitch options ideally at mid tip speeds of 16,000 ft/min.

Slashes heavy vegetation at higher range of line blade tip speed (even below 24,000 ft./min, where conventional line cuts inefficiently even at tip speeds exceeding 30,000 ft/min.)

Power head and attachment combination beneficial for retailer inventory space reduction.

Power head and battery becomes a common driver for other attachment tools, saving the multiplicity of individual power motors for each tool.

Figure 28:
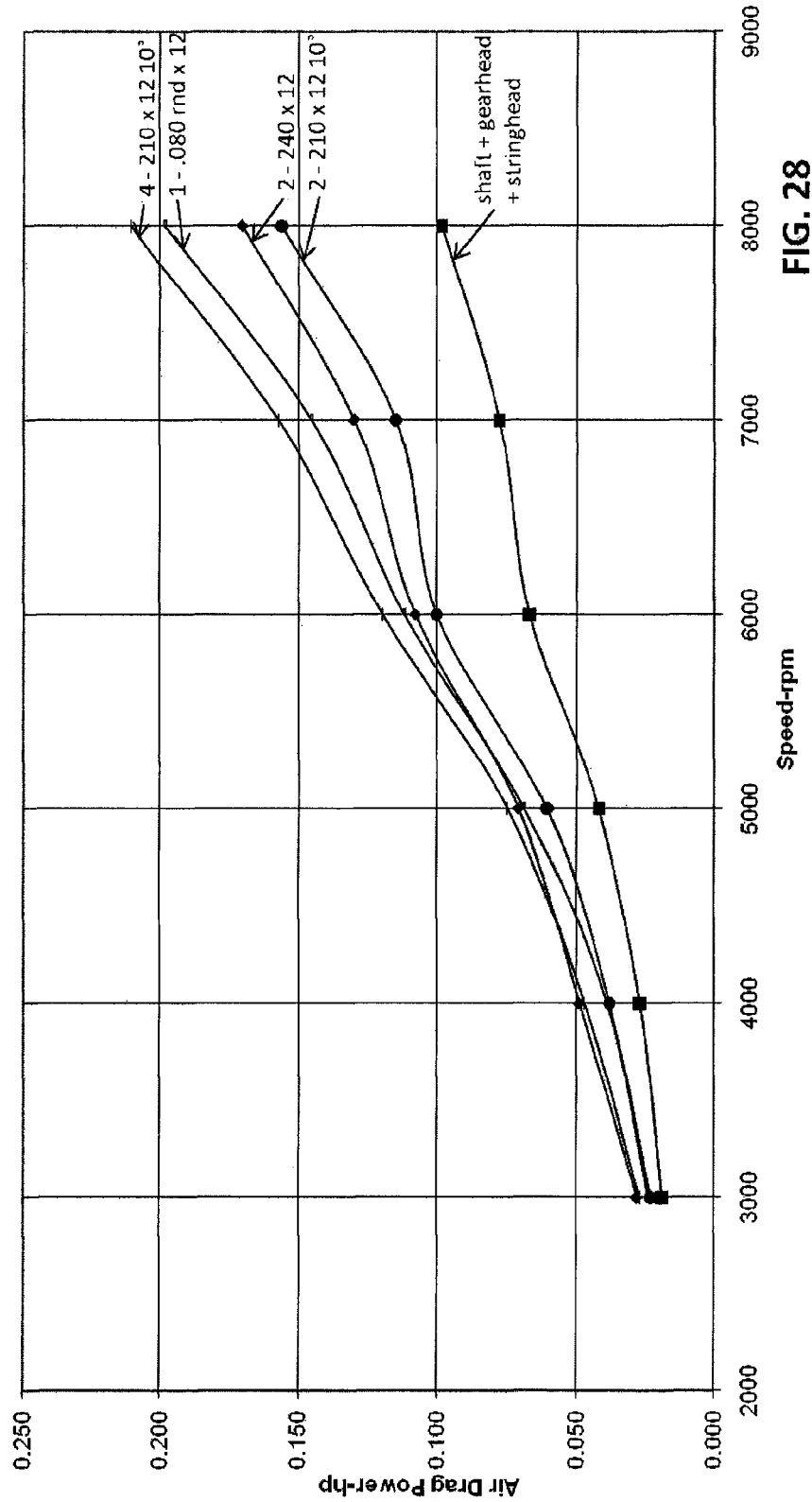
FIG. 28 shows horsepower data through a cable drive and gear box with different cutting line configurations.
Figure 29:
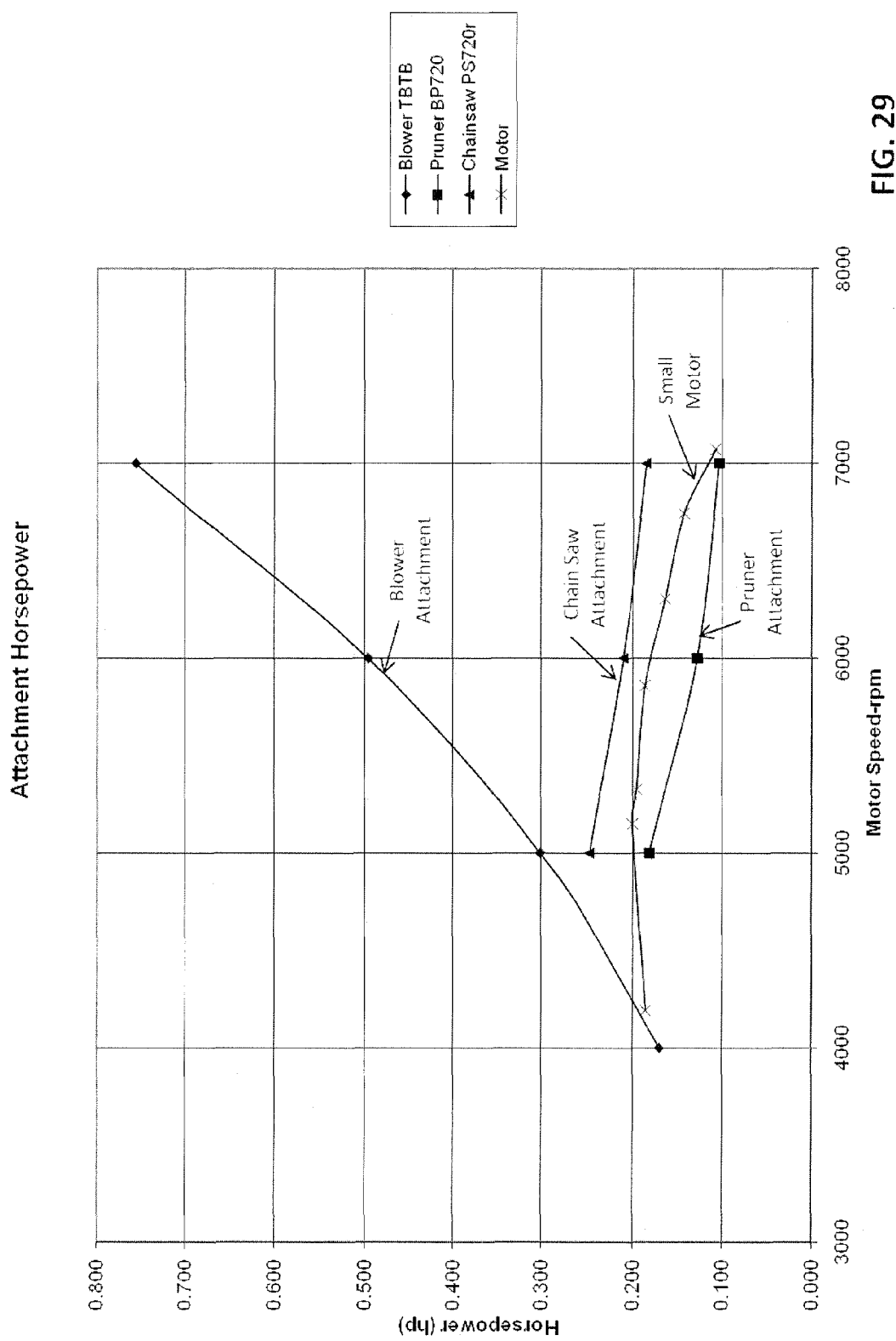
FIG. 29 shows horsepower data through a cable drive and gear box for different attachment tools.
Figure 30:
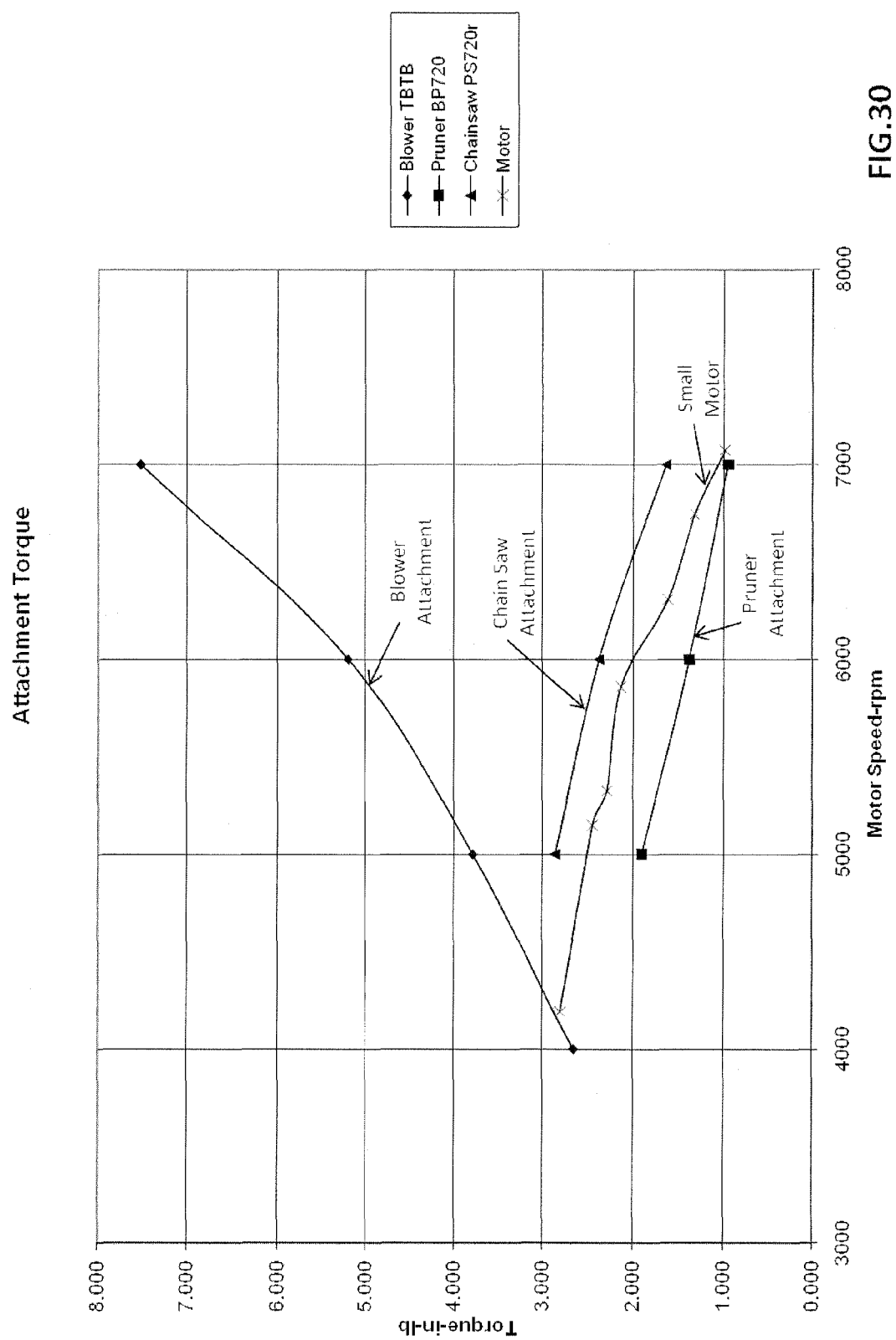
FIG. 30 shows torque data through a cable drive and gear box for different attachment tools.

Dynamometer testing establishes horsepower and torque required for various cutting line configurations through both direct and/or split boom cable drive systems, and for other combined cutting tool attachments at their respective operating speeds. See FIGS. 28-30.

Tethering cord to external battery sources with larger capacities is possible, such as a belt pack, a back pack, a battery companion cart, etc.

Numerous concepts of this are also applicable to corded (AC or DC) power sources, and gas powered sources Velcro strap option at power head arm rest to optionally secure the user's arm to the arm rest.

Figure 25:
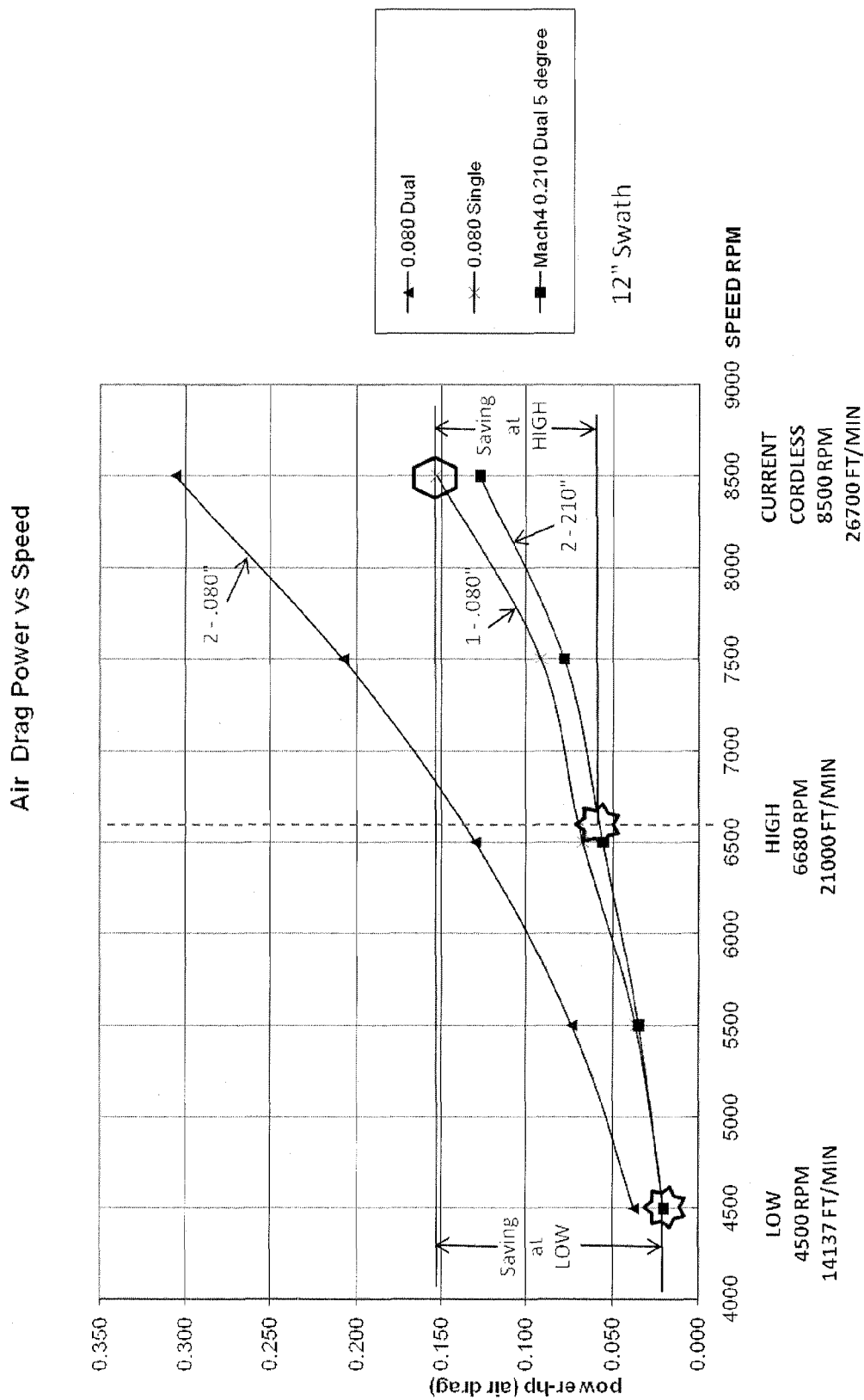
FIG. 25 shows the air drag power differences at the speeds where one conventional 0.080" line runs compared to two aerodynamic line blade high and low speed range.
Figure 25A:
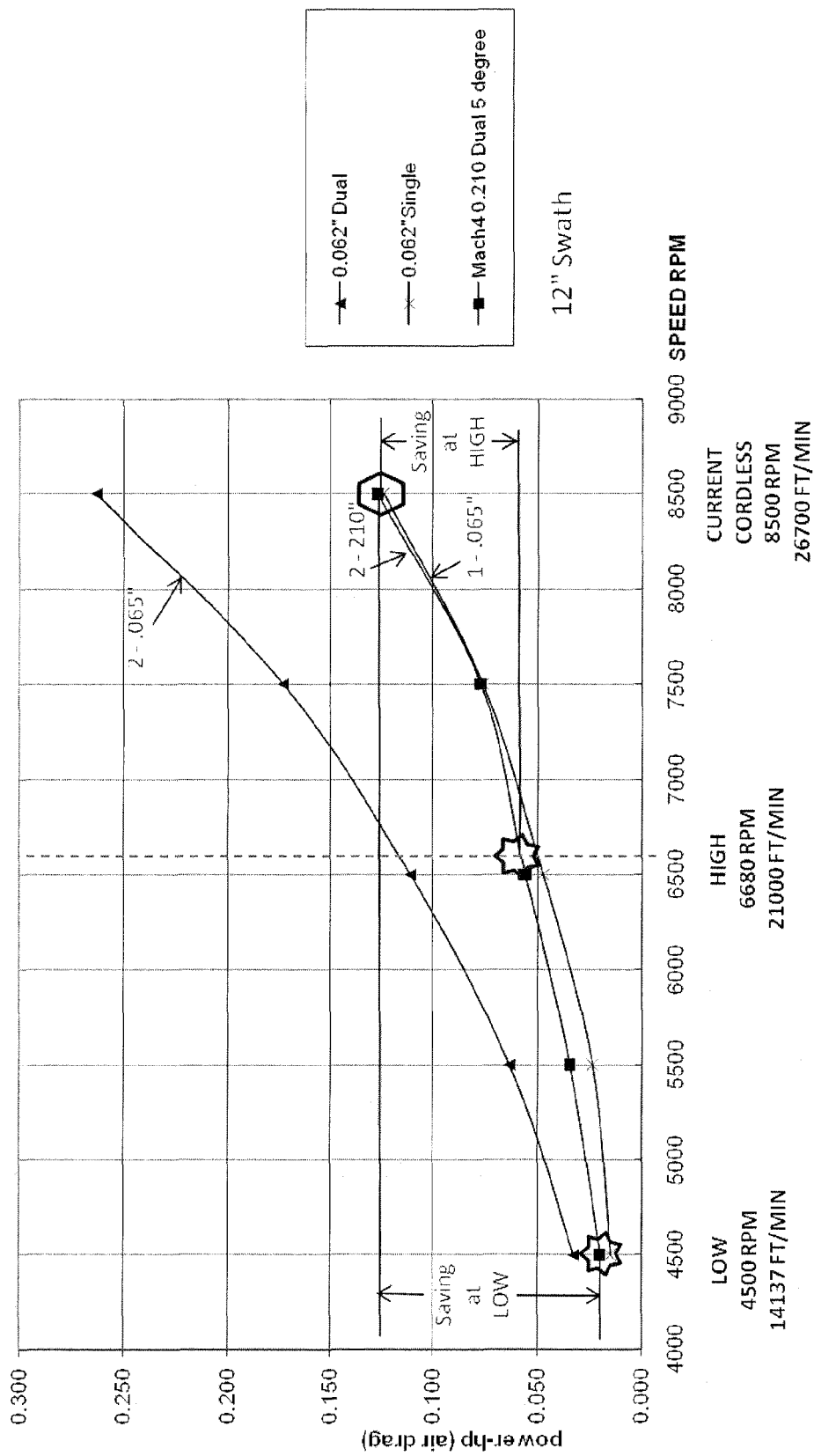
FIG. 25A shows the air drag power differences at the speeds where one conventional 0.065" line runs compared to two aerodynamic line blade high and low speed range.
Figure 26:
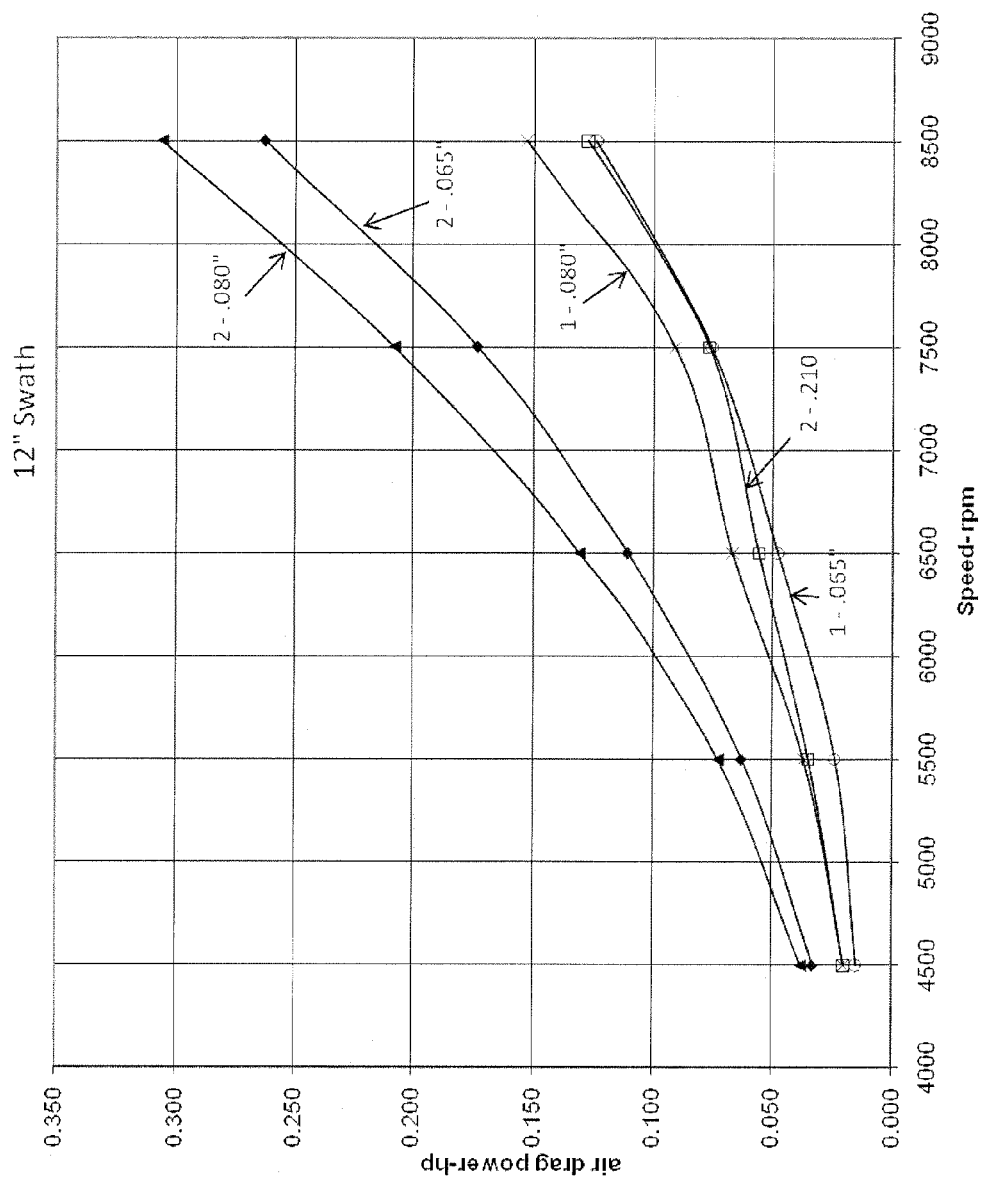
FIGS. 26 and 27 show air drag power for conventional lines and aerodynamic line blades.
Figure 27:
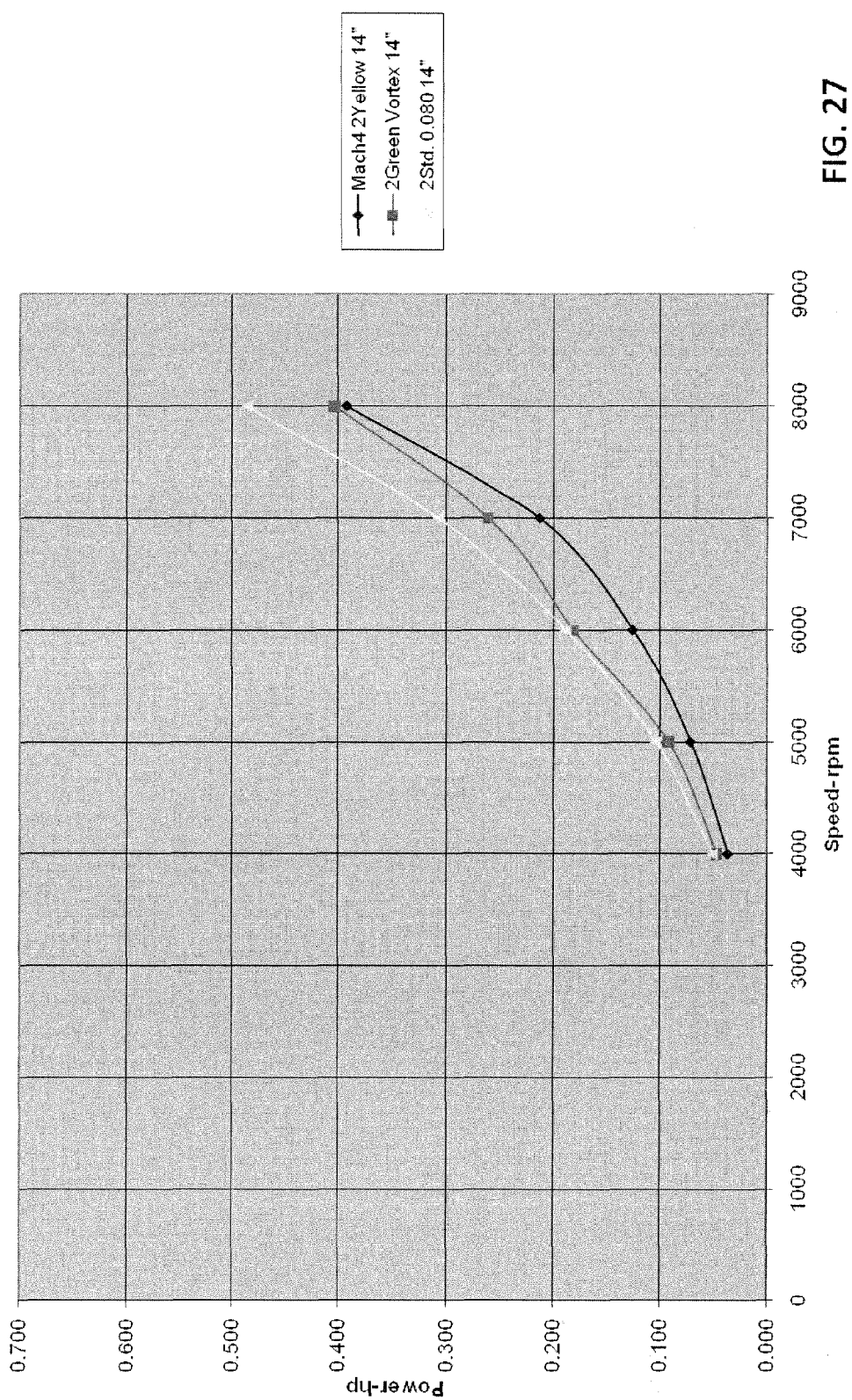

Dynamometer power and torque testing curves are presented confirming the potentials for power saved, and to be better and more productively utilized (see FIG. 25).

Smaller capacity batteries and more extended economical selections of older technology batteries are utilized for the intended job completion; enables a better cost advantage to remain competitive at various market selling price points.

The flexible molded line blades provide numerous advantages over prior symmetrical trimmer line structure. The line blades include stronger blade-like, non-symmetrical profiles directionally maintained cutters (rectangular, rombus, ellipse, tear drop, etc.). The long dimension is greater than 1.1× symmetric round, square, star, hex, or triangular profiles. The blades may have increased levels of cutter mass. As noted, the blades preferably have an aerodynamic cross-section. The stiffer blade sections are more capable to deliver higher torque in edging with a living hinge that limits motor torque (unlike weak monofilament which easily folds throughout its fully weakened beam). The use of two or more (preferably an even number) blade outlets favor the lower speeds which further reduces air drag, helping better balance and increased kinetic cutting energy. The nature of the multi-sectional molded line blades enables the trimmer head to operate at lower tip speed, for example, below 21,000 ft/min (which is the lowest cutting speed for 0.065 inch mono line), and as low as 10,000 ft/min when vegetation is supported against a hard or abrasive surface to achieve lower wear rates against abrasive surfaces.

Conventional symmetrical lines of low mass fold back easily and slide through grass with inefficient cutting and high grass drag power waste. Due to added "blade-like" stiffness using the molded line of the invention, more cutters of higher mass and inherently higher kinetic energies, lower drag levels at lower speeds, and aero profile streamlining for aerodynamic drag reduction, all favor energy recovery and less battery capacities needed.

Equilibrium line blade speeds and system inertia tuning limits harmful high amperage spiking. The sturdier line blades of the invention deliver higher cutting kinetic energies (at all speeds compared to mono lines) through the low to high speed range with relieved amperage spikes from line blade stalling.

Because today's cordless trimmers use only one thin monofilament line, their torque delivery remains low to reduce amperage spiking, but they do not cut well. The weak line folds back and drags through the grass (burning and wasting valuable energy) while leaving it mostly uncut. This line-sliding acts as an amperage limiter, or buffer, to inherently prevent high amperage spiking. Most importantly, the weak line cannot deliver the torque needed to effectively cut grass. Because the line blades of the invention can deliver much higher torque, they not only cut much better, but harmful amperage spiking will be higher unless there is a designed amperage 'spike limiting' means provided as further described:
 The subject line blade's molded flexible hinge and higher mass cutter section, where equilibrium hinge bending force and grass contact force become balanced, as targeted, so that the hinge will bend to enable line blade to fold back, thus relieving the cutter from stalling and to limit undesirable amperage spiking.

Torque delivery of the line blades increases with increased speed and the added cutting force overcomes the restrictive grass force, thus allowing the cutters to cut grass. However, when the grass force or resistance gets too high, the line blades begin to stall or rapidly decelerate, thus putting a higher torque demand onto the motor. Then, amperage begins to spike and to rapidly discharge valued and limited battery stored energy.

At an equilibrium low speed, the hinge releases to act as an anti 'stall' system to limit motor torque requirement, thus limiting torque reflected back to the motor to prevent amperage spikes.

The system also acts to reduce amperage spiking at higher speeds. It involves a minimum system inertia for continued momentum (flywheel effect) which allows a very small increment of time for line blades to fold back on their outlet hinge, thus to reduce the rapid line blade speed drop and/or resulting amperage spiking. Essentially, spiking results from rapid line blade decelerations due to an excessively rapid bind or stall.

A minimum inertia is also helpful for low speed edging and scalping to reduce the occurrence of amperage spiking.

Stronger "blade-like" cutters deliver higher torque than conventional line in order to deliver the necessary force to provide superior cutting. When the cutters "de-accelerate" or begin to stall, amperage begins to spike causing battery drain. While flimsy mono lines also waste more power due to high drag (grass and air), they don't stall or amperage spike because they easily bend and slide along the grass to result in poor and inefficient cutting.

Essentially, the invention evidences how strong line blades can perform with minimum amperage spiking yet accomplish highly superior cutting performance well beyond the capabilities of conventional cordless trimmers with monofilament cutting line.

Tuned Speed Options

Specific equilibrium stall speeds are empirically determined by calculation guidelines and testing of the specific characteristics of the line blade and system being targeted. The development process includes low speed cutting, amperage measurements, stall speed determination, and final motor selection. The variables are included in the process, and the lower speed range is chosen.

Figure 31:
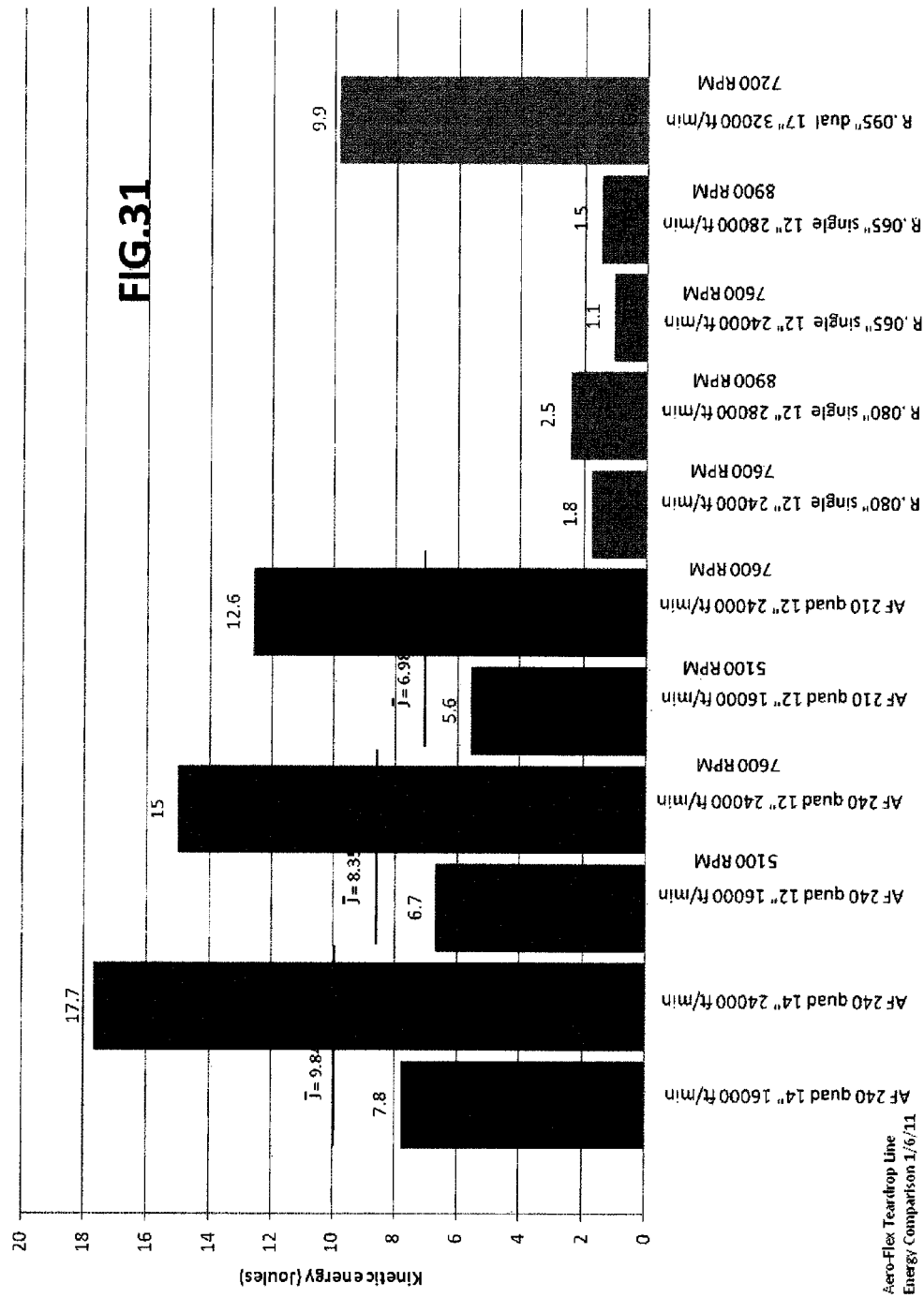

This method and discovery offers cordless trimmers a scientific determination to maximize the superior cutting efficiencies (compared to mono lines), with major energy and cutting efficiencies, durability, substantially higher energy level cutting options (even at the lowest speed range levels), substantially below the minimum speed cutting capabilities of conventional line; while at the higher and more elevated speed ranges, high kinetic energies for efficient cutting are most impressive. See FIGS. 31 and 32

Major energy savings are achieved due to recovered grass and air drag, more cutters of higher individual mass (they have higher stored energy to release), and more blade-like cutter stiffness to effectively accomplish the same job at the more beneficial lower line blade tip speeds and with lower battery energies consumed (also reduced noise). A better job is accomplished, faster, easier, more economically, and with lower charge energies required to be stored in the battery.

The line blades are preferably molded with a blend of impact resistant additives to polyester. A DuPont #8620 Blend has been developed over a 5 year period (trying numerous blend ratios) to solve the moisture dependency and brittleness associated with the conventional use of nylon copolymers that dry out on shelves over a period of time. Dryness of nylons is accelerated if exposed to dryer atmospheres and colder climates. Dryness occurs to nylon based lines being garage stored over the winter period, or on retailer's shelves and warehouses. This "dry" (non-moisture dependent) polyester material blend, or with similar blending intent, can also apply to extruded lines.

The material eliminates the lengthy and costly moisturization process required for the nylons. Additionally, the line blades are produced with more uniformity in straightness and general looks.

The line blades may be stretched or 'oriented' by specific zone along the line blade, and by degree of orientation (i.e., % of fully oriented). Zones may be defined along the blade. For example, with reference to FIG. 12, a first zone 70 may include a mounting tab 72 and a hinge 74, and a second zone 76 may include a portion of the blade subject to high impact.

Figure 13:
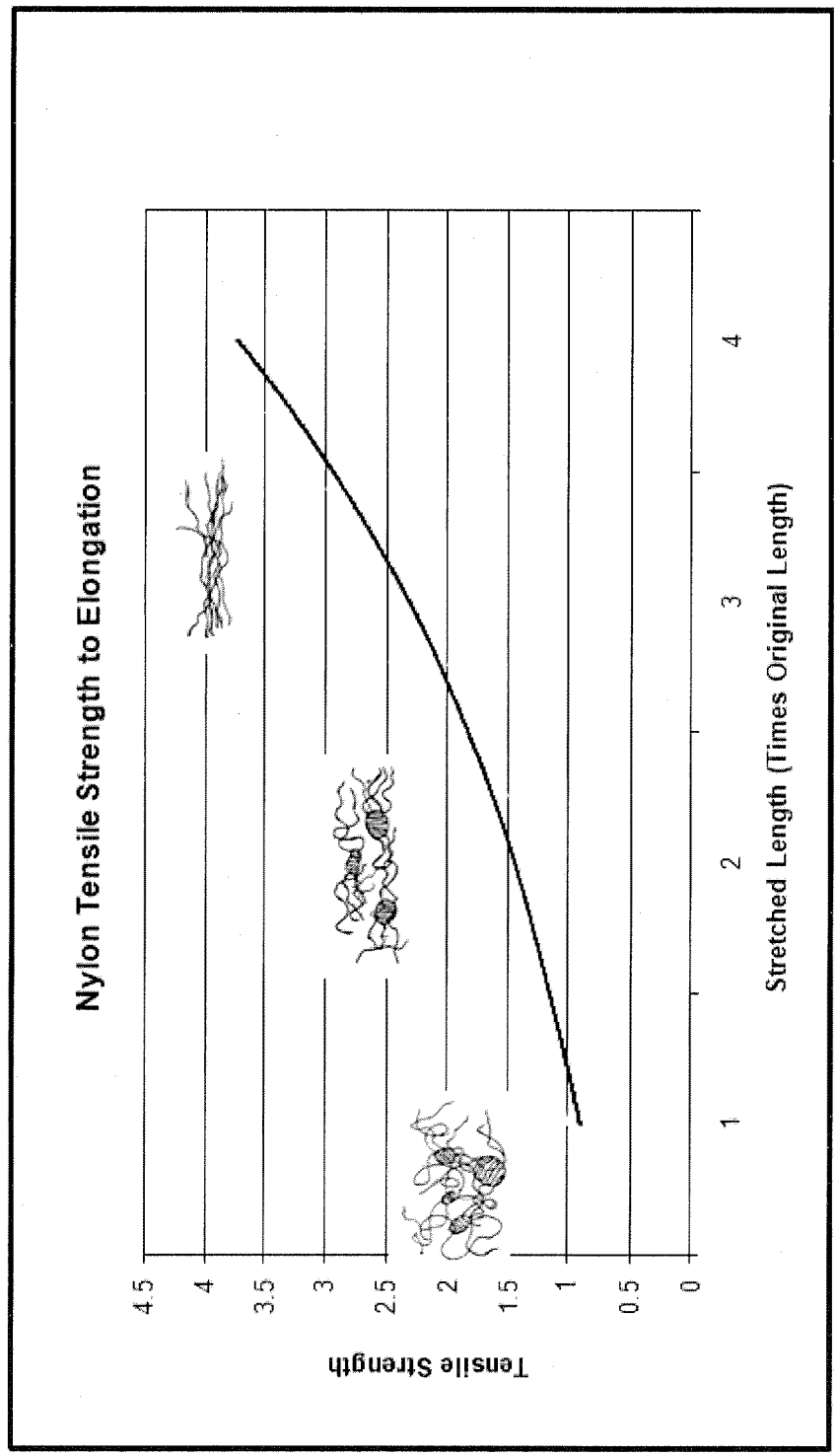
FIG. 13 is a chart showing tensile strength vs. elongation.
Figure 14:
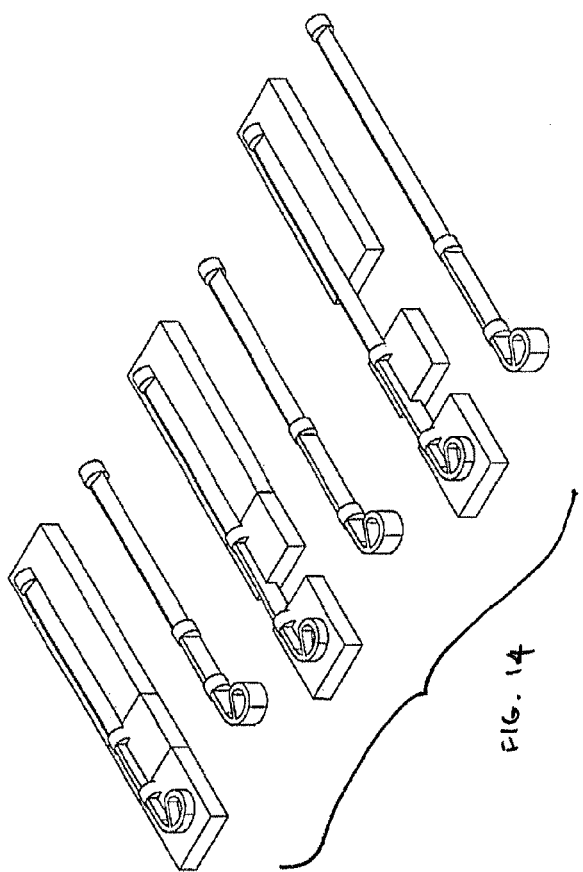
FIGS. 14-15 show procedures for orienting the line blades using a molding tool.
Figure 15:
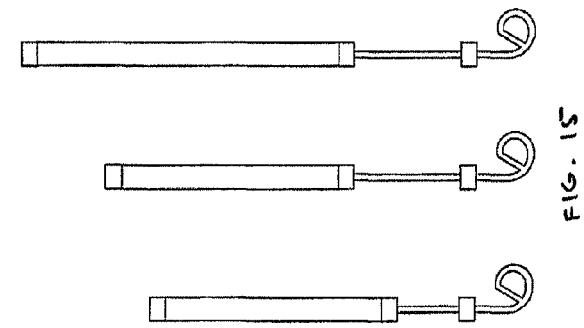

Ideally, 50% stretch or orientation from initial length at points subjected to high impact forces (zone 2) to prevent molecular chain splitting into the ends (fibrils) via a final cross-aligned bonding or webbing of the molecular chain structure. This process applies to any material (nylons, polyesters, etc) that can be "oriented." This is done to increase tensile strength (nylons up to 4 times its strength after molding or extruding—see FIG. 13) to where it is needed for example at the outlet hinge (zone 1) where it can be stretched to ideally 80%. This can also be processed for extruded line but only a single percent due to one configuration cross section. Different sections of a molded line can achieve its own desired percent stretch by combination of "raw molded slug design" and degree of physical stretch desired at that specific zone.

Zone 1—For necessary high tensile strengths in the hinge region; specific weak area found to be at the outlet zone or region; looking to maximize tensile strength while reducing potential for impact splitting; depending on application, a more desirable level is about 80%. The range of 10-80% is needed for most general applications, with a maximum orientation of about 80%. This is desirable for a stronger tensile, but also cross-aligned to achieve minimal splitting.

Zone 2—For necessary or targeted tensile strengths and proper anti-splitting along the cutter blade high impact region, specific weak areas were found to be at mid to tip region; orient to increase tensile strength as much as possible while substantially reducing the potential for impact splitting; depending on cutter mass and degree of impact application, a more desirable target level is about 50%. The range of 5-70% is needed for most general applications, with a target orientation of about 50%. This is desirable for a strong impact resisting, anti-splitting cross-alignment while achieving added tensile strength for abrasion resistance.

Note the added thickness of the "slug" part which thins out with stretching or elongation pulling. See FIG. 12. The original cross sectional shape is proportionately maintained, and is "drawn" down to a dimension that exactly fits the receiving slot dimensions of the head.

Orienting also allows a higher designed mass added to the outer end of the cutting line blade (for heavier commercial applications), by the addition of a reinforced or oriented outlet or living hinge. Such reinforcement increases the tensile properties needed to withstand the added forces resulting from the added mass out at the cutting radius, and to physically fit the existing slots within the receiver head.

Figure 12:
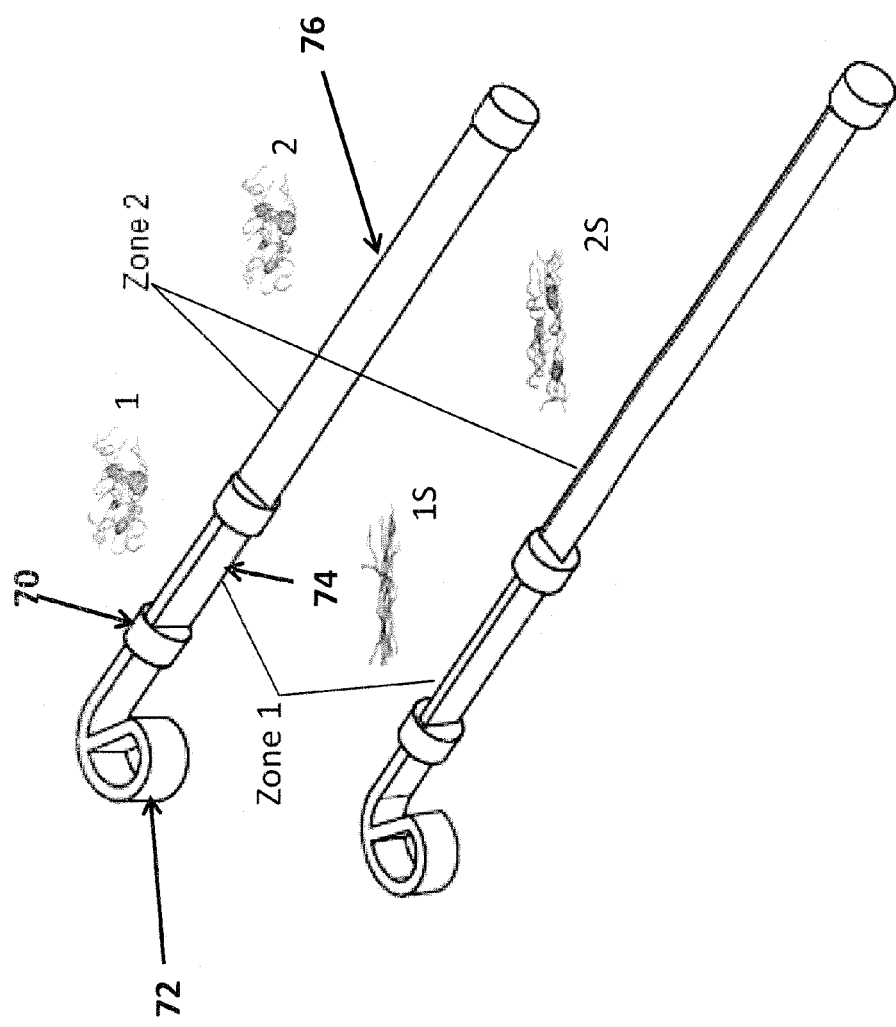
FIG. 12 shows the line blade before and after orientation.

Also note in FIG. 12 the "slug" grabbing elements, for example, one in the center, and one at the end. Both outer segments of the "fat" molded line blade are pulled to different stretch elongations to achieve the desired percent stretch. The outer slug is trimmed from the part leaving the finished cutting end of the reinforced line blade.

The orienting process enables different zones of a molded or formed line blade at different percent levels to achieve specific design purposes targeting different superior performance benefits. The process results in substantially strengthened blades beyond "as molded" blades.

While maintaining the same slot receiving dimensions in the heads, and for the same heads to accept stronger line blade configurations, it is desirable to avoid dimensional changes between different grades of cutting line blades. This process allows modifications of the strength features of the line blades without changing the head configuration. This avoids confusing supplies of heads, and maintains simplicity of a common fit of both "as molded" line blades and "super tough" (oriented) special strength commercial line blades.

The oriented blades also better absorb max impact energies and high forces along the cutting segment to thereby reduce chipping and splitting, and to reduce impact splitting down the fibril or molecular chain by providing a less aligned, cross-linked, or cross-chained molecular alignment.

Still further, oriented line blades achieve increased outlet hinge strength to prevent "necking" or high tensile stretching and pull beyond yield that results in earlier breakage.

Very aggressive torture testing was performed on a 21 CC two-cycle engine commercial trimmer using the same four-outlet head with two 'as molded' and two 'oriented' line blades. Test results were outstanding comparing 'as molded' line blades with 'oriented' line blades running two 'as molded', and two 'oriented' on the same four-line blade head. Therefore, each line blade experienced the very same torture forces and high impacts. Oriented Zone 1 did not pull or neck while three sets of 'as molded' were replaced due to permanent necking at the outlet. In other separate and direct contact to rough concrete, abrasion tests on the cutting Zone 2, 'oriented' line blades outlasted 'as molded' by more than 85%.

Another design advantage is to increase and create elevated hinge strength when added cutter mass is needed for power cutting better kinetic energy and to extend better and longer abrasion life. For example, taper a higher mass more toward the outer cutting radius of the line blade swath or toward the greater radius in cutting region.

High volume productivity and uniform dimensions are achieved with different orientation processes. With reference to FIGS. 14-22, this process begins (see FIGS. 18-19) with 'slugs' loaded at station 80 into a forward moving receiving conveyor through a heater to warm or heat the slugs (or immediately after molding to utilize the already hot molded slug), and are loaded onto a stretching apparatus 82 with positioned adjustable cam settings 84. The apparatus 82 holds the gripper section of the line while pulling or stretching from another section. The slugs are pulled to a predetermined percent of their original length. The slug at the end of the cutter line blade is trimmed off. Depending on the materials used, finished parts are immediately processed through packaging, or directly into moisturization (if nylon).

There is a major design advantage of multiple geometries with the combination of molded, orientable materials combined with localized zones of reinforcing with orientation processes and methods provided. This also minimizes and reduces material waste to be able to thin out connecting web sections of high tensile strength while concentrating higher mass at the outer radii where the kinetic energy is needed.

Figure 17:
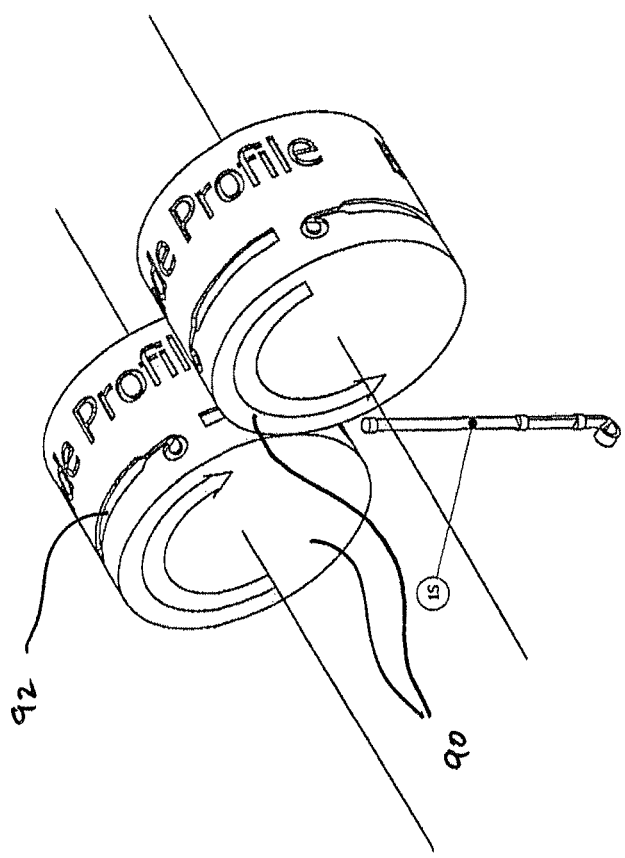
FIGS. 16 and 17 show a rolling/coining process.
Figure 16:
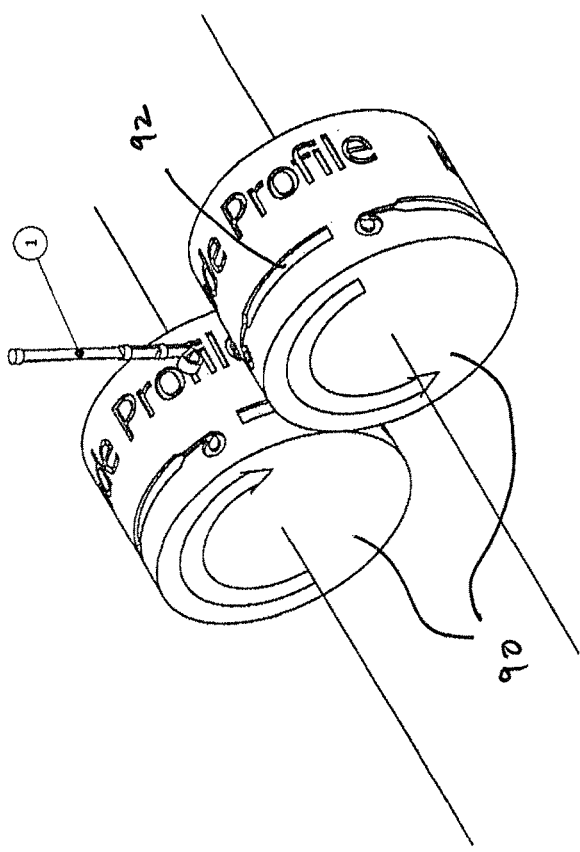

Alternative processes may be utilized to accomplish orientation of the line blades. FIGS. 16 and 17 show a rolling/coining process from a molded slug. The rollers 90 pull or stretch the blades within preformed holders 92. FIG. 20 shows a process including a hot extrusion fed into preformed cavities within rolls 94 that may be heated to then squeeze the blades to a final form from premachined line geometry circumferential tracks with line geometry cavities 96. FIGS. 21 and 22 show an orienting process using heated bath media 98 where a liquid such as oil, water or other controllable liquid heat is heated via heating elements 100, and the line is stretched by zone utilizing holding blocks 102.

Figure 24:
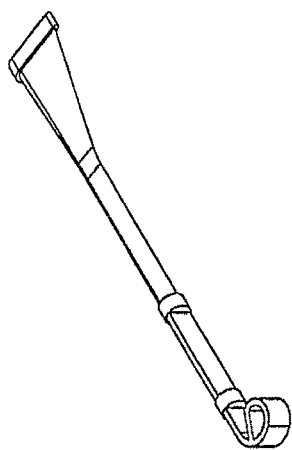
FIGS. 23 and 24 show cutters before and after orienting a high concentrated mass at outer radius.
Figure 23:
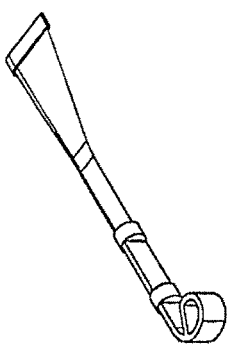

The orienting process is applicable to nylons, polyesters, copolymers, acetyls and any orientable materials. FIG. 23 is a molded line blade with heavier mass concentrated at a greater radius. To orient allows the designer to thin out the connecting web sections of high tensile strength (oriented) while concentrating higher mass at the outer radii. See FIG. 24 where the kinetic energy for cutting very heavy vegetation is needed and concentrated. This creates another design advantage to increase and create elevated and more supportive hinge strength when added cutter mass is needed for better kinetic energy cutting power. Also, the added mass of a stronger tensile cutting zone when oriented will extend better and longer abrasion life. For example, taper an oriented and higher mass more toward the outer cutting radius of the line blade swath or toward the greater radius in cutting region.

The above discoveries will improve line blade shelf life, endurance, operating life, production capacity, at lower cost, with extended vegetation cutting capabilities.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A power tool comprising:
   a rotatable head operatively connected to a motor via a drive shaft or a cable drive; and
   flexible line blades secured to the rotatable head, wherein the flexible line blades are divided into geometrical zones along a length of the line blades, and wherein the line blades are oriented by zone to increase tensile strength and prevent end splitting, the line blades being oriented comprising an amount of parallel fiber alignment in a molecular chain of the line blade material, wherein degrees of parallel fiber alignment are varied across the geometrical zones.

2. A power tool according to claim 1, wherein the flexible line blades comprise molded line blades.

3. A power tool according to claim 2, wherein the flexible molded line blades have a flexible living hinge and an aerodynamic cross-section.

4. A power tool according to claim 1, wherein the zones include a hinge zone and a cutting zone, and wherein a percent orientation of the hinge zone is different than a percent orientation of the cutting zone.

5. A power tool according to claim 4, wherein the hinge zone is 10-80% oriented, and wherein the cutting zone is 5-70% oriented.

6. A power tool according to claim 1, wherein the rotatable head is tiltable and turnable.

* * * * *